United States Patent [19]

Kasahara

[11] Patent Number: 5,751,515
[45] Date of Patent: May 12, 1998

[54] RECORDING AND REPRODUCTING HEAD SLIDER HAVING MULTIPLE SLIDER RAILS AND A PROJECTION PORTION

[75] Inventor: Akihiro Kasahara, Chiba-ken, Japan

[73] Assignee: Kabushiki Kaisha Toshiba, Kawasaki, Japan

[21] Appl. No.: 591,002

[22] Filed: Jan. 24, 1996

[30] Foreign Application Priority Data

Jan. 24, 1995 [JP] Japan ................................ 7-027226

[51] Int. Cl.$^6$ .............................. G11B 5/48; G11B 5/60
[52] U.S. Cl. ................................. 360/103; 360/104
[58] Field of Search .................................... 360/103, 104

[56] References Cited

U.S. PATENT DOCUMENTS 5,537,269  7/1996  Zarouri ............................ 360/104
5,636,086  6/1997  Belasna ........................... 360/103

FOREIGN PATENT DOCUMENTS 5-74090  3/1993  Japan.

Primary Examiner—A. J. Heinz
Attorney, Agent, or Firm—Foley & Lardner

[57] ABSTRACT

A recording/reproducing head slider is provided which has a recording/reproducing head for recording and reproducing data in and from a recording medium. The head slider is installed in a recording/reproducing apparatus and driven so that the head slider floats over the recording medium by a hydrodynamic force. The head slider has multiple slider rails, each with a surface that faces the recording medium. The recording/reproducing head is fixed to an end of one of the slider rails. The head slider includes a push force application point surface portion for application of a push force which is located on the head slider closer to one slider rail than another slider rail. The head slider may have a first slider rail and a second slider rail. Further, the head slider may have a main slider rail; a first subsidiary slider rail; a first connecting portion connecting the main and first subsidiary slider rails; a second subsidiary slider rail; and a second connecting portion. The head slider may also have a main slider rail with plural main slider rail surface portions and a subsidiary slider rail with plural subsidiary slider rail surface portions, the main slider rail and subsidiary slider rail surface portions all having respective surface areas facing the recording medium.

20 Claims, 32 Drawing Sheets

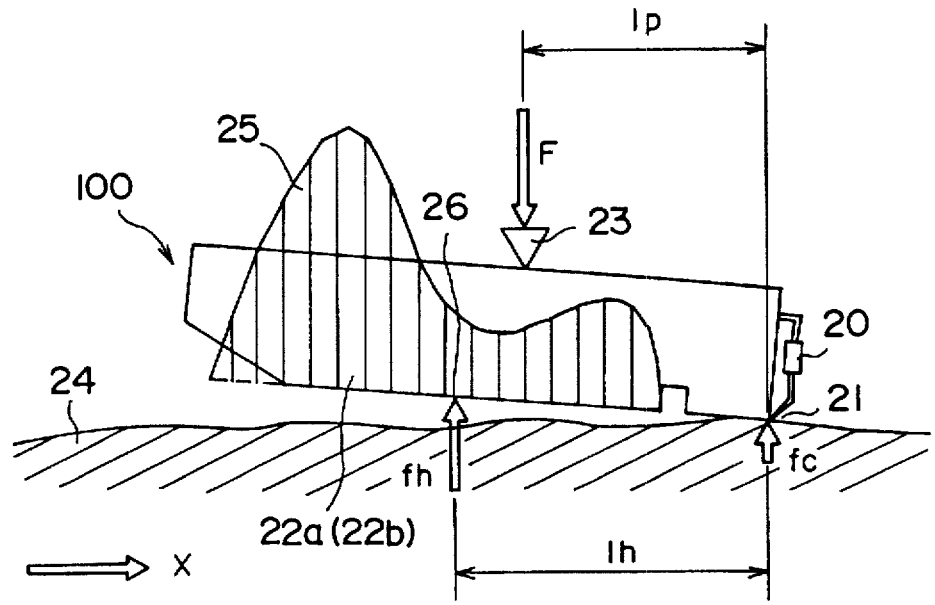
FIG.I PRIOR ART
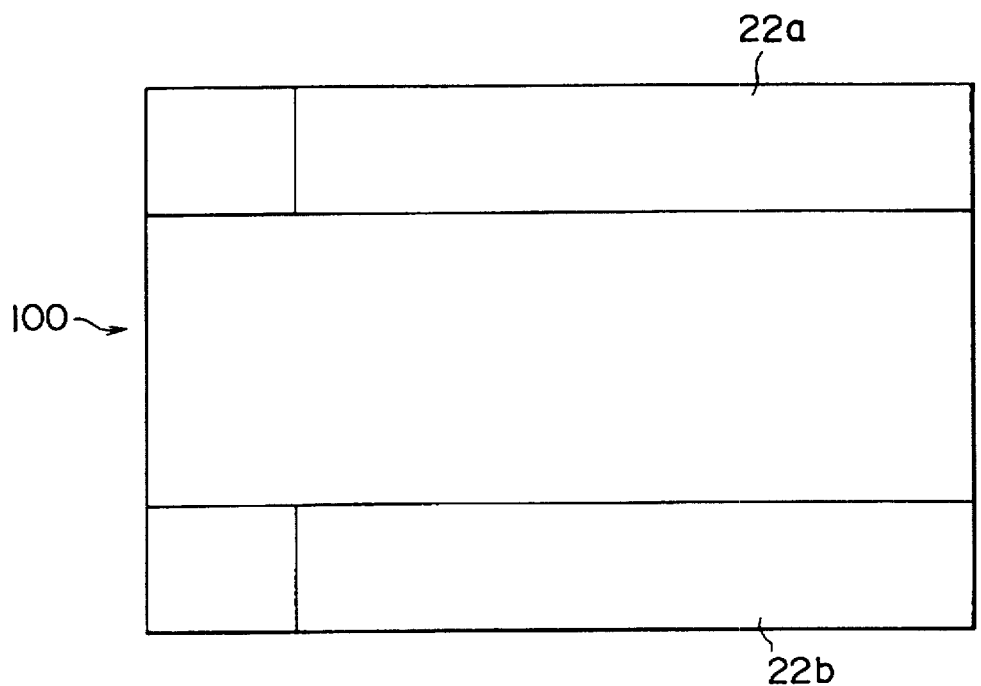
FIG.2 PRIOR ART

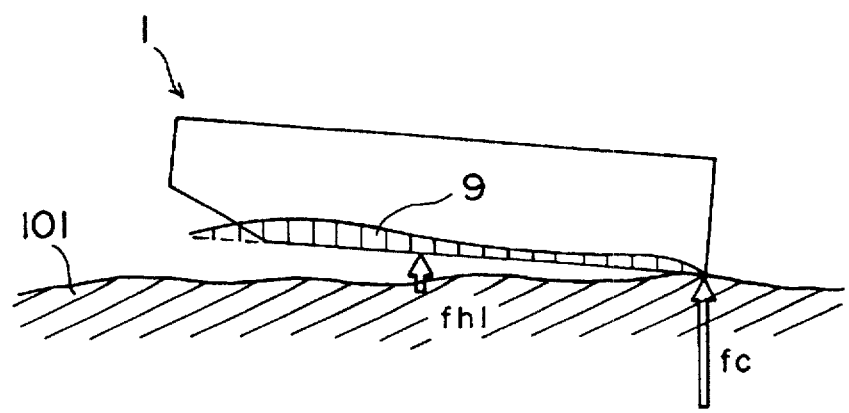
F I G. 9
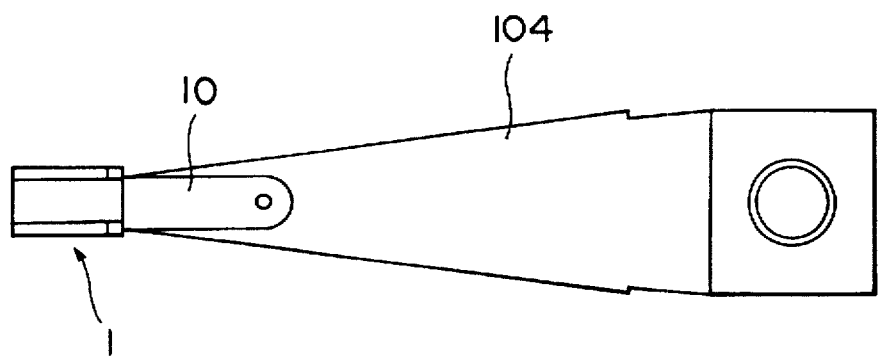
F I G. 10

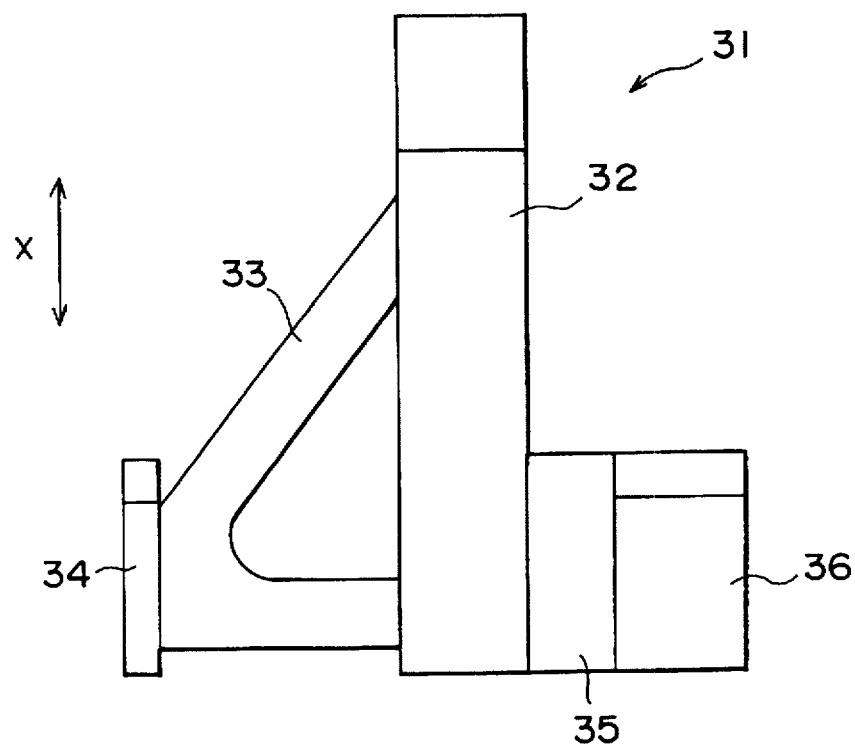
F I G. 20
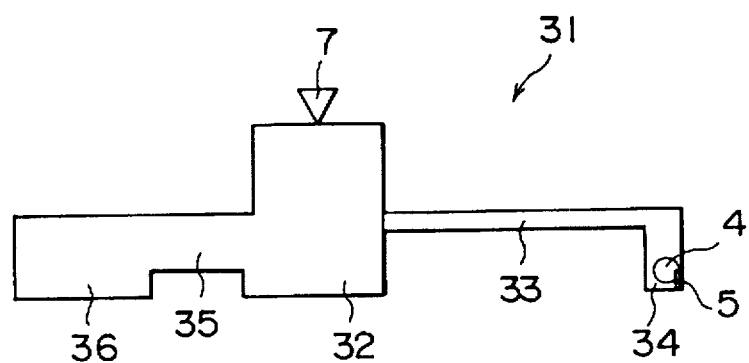
F I G. 21

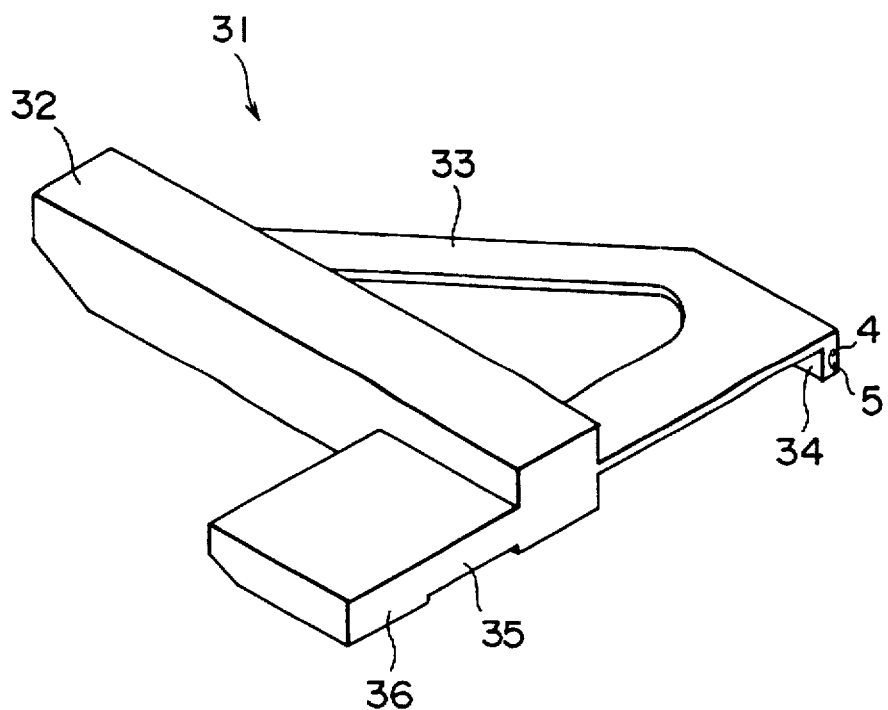
F I G. 22
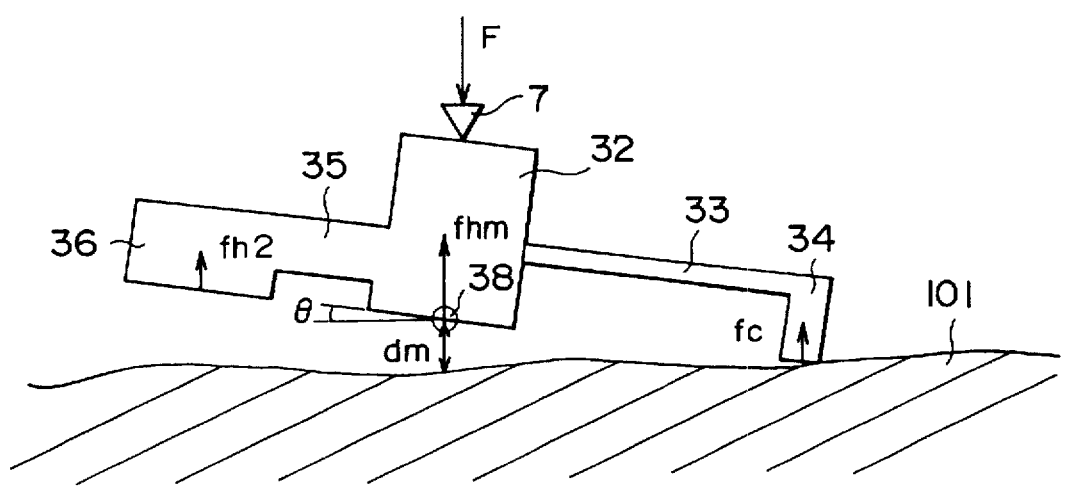
F I G. 23

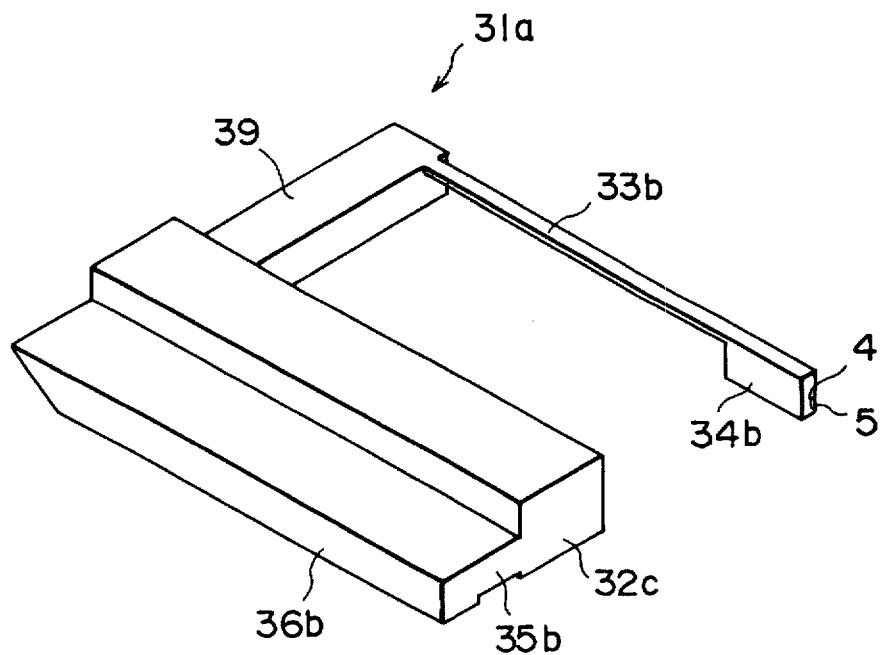
F I G. 38
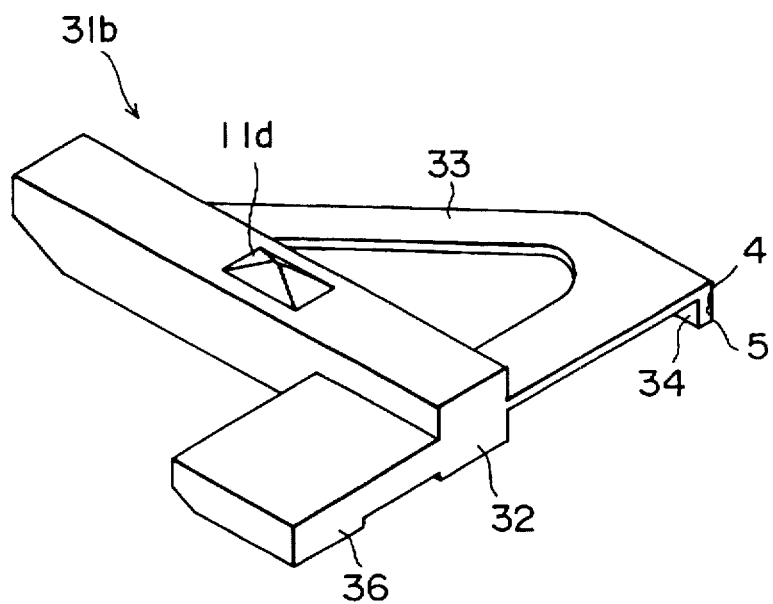
F I G. 39

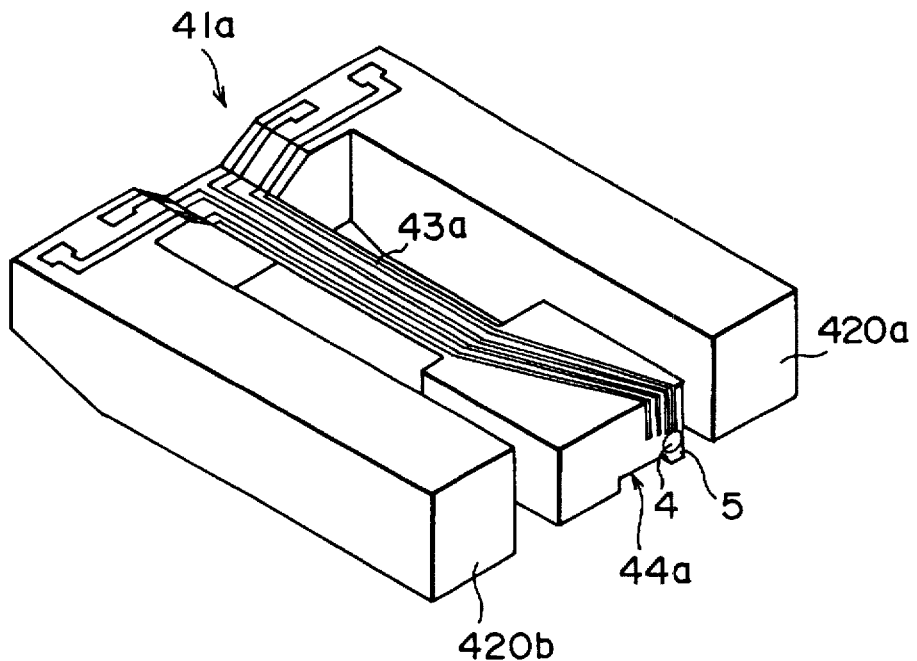
F I G. 52
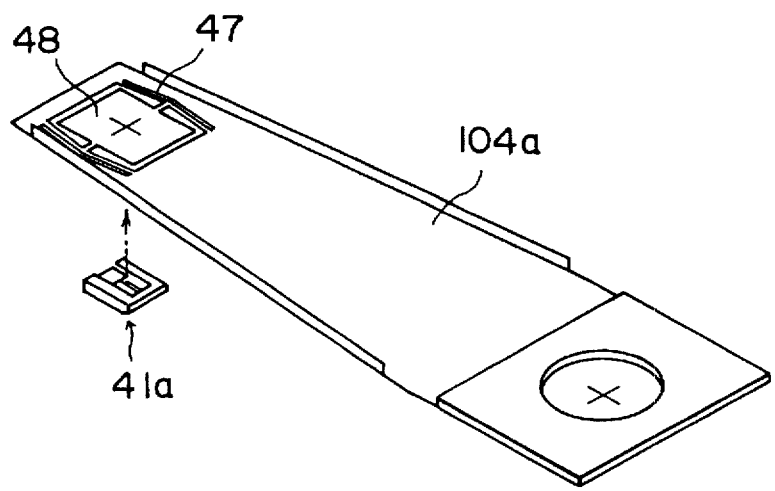
F I G. 53

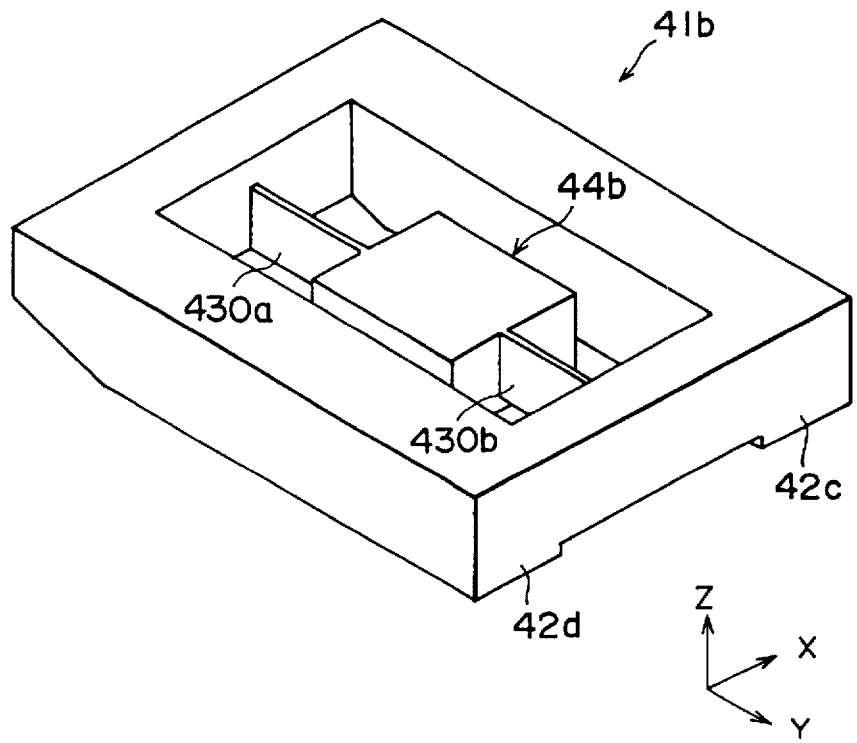
F I G. 57
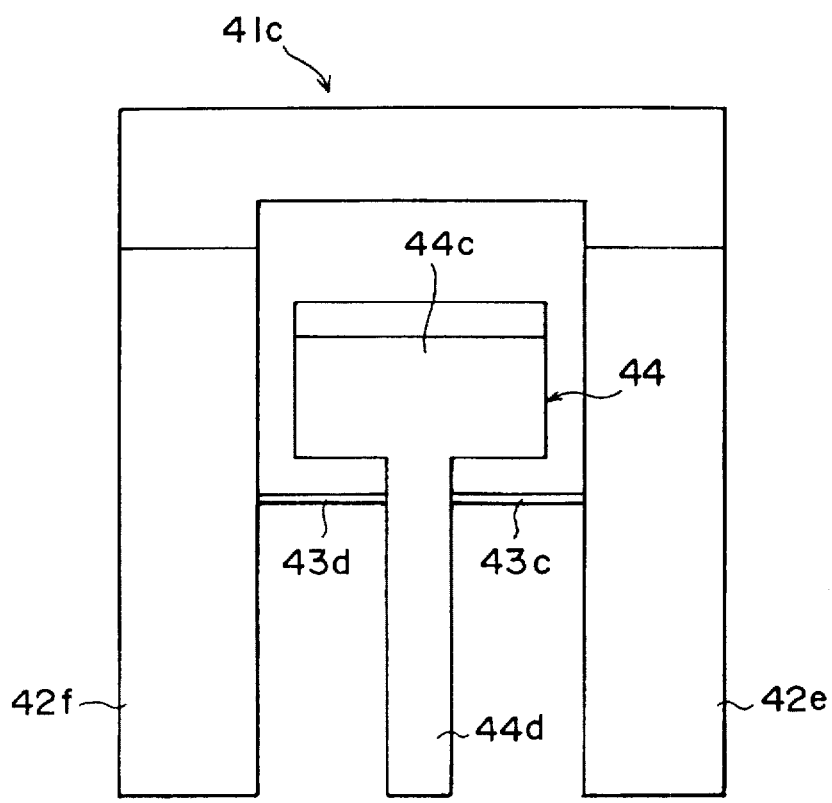
F I G. 58

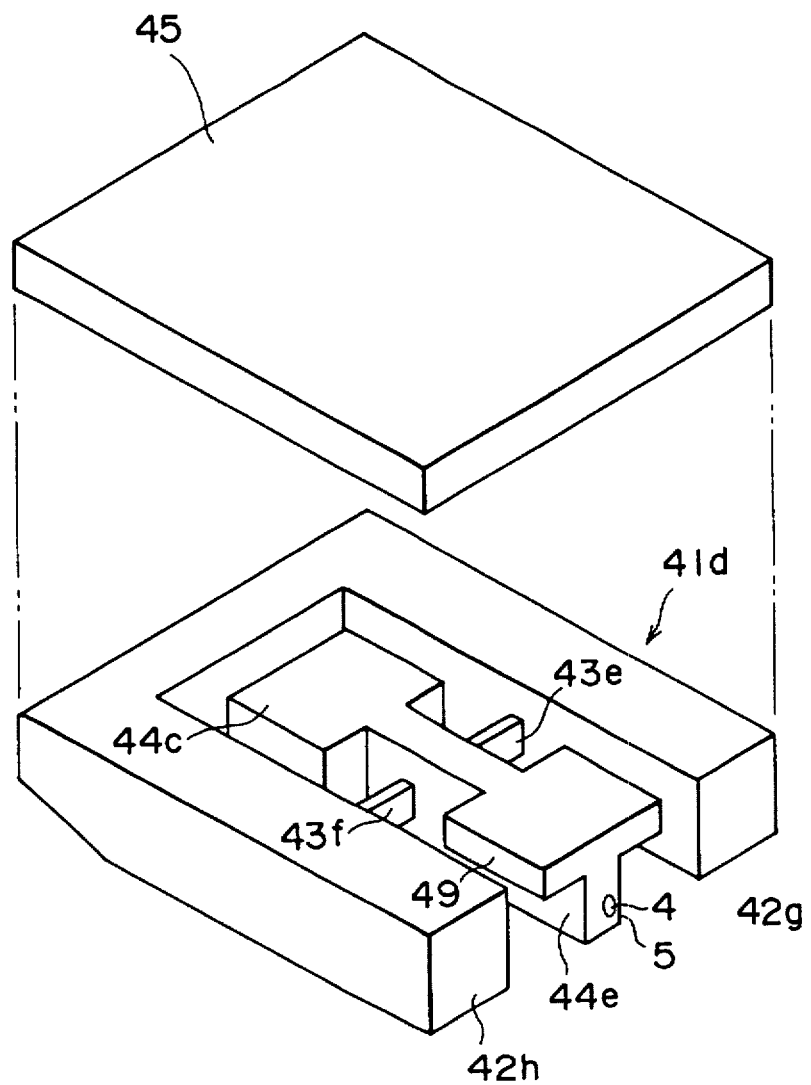
F I G. 63

RECORDING AND REPRODUCTING HEAD SLIDER HAVING MULTIPLE SLIDER RAILS AND A PROJECTION PORTION

BACKGROUND OF THE INVENTION

1. Field of the Invention

The present invention relates to a recording and reproducing head slider used to record and reproduce data in and from a data recording medium such as a magnetic disk, and a recording and reproducing apparatus provided with the recording and reproducing head slider.

2. Description of the Prior Art

In the field of recording and reproducing apparatus, the technique for increasing the recording density of the data recording medium has been developed energetically. In the case of the magnetic disk apparatus used as one of the recording and reproducing apparatus, for instance, there exists such a tendency that a spacing (floating gap) between the magnetic disk (i.e., data recording medium) and the magnetic head (i.e., the recording and reproducing head) is narrowed more and more with the increase of the recording density. Further, in the future, it is considered that there exists a high possibility that data can be recorded and reproduced in and from the data recording medium under a condition such that the magnetic disk and the magnetic head are in contact with each other. In the case where data are recorded and reproduced under the contact condition between the magnetic disk and the magnetic head, the most important problem to be solved is to reduce the wear or abrasion between the magnetic disk and head. To reduce the wear between the two, it is indispensable to hold the contact condition between the magnetic disk and the magnetic head under a stable low load.

Some examples of methods of stably maintaining the contact condition between the magnetic disk and the magnetic head are disclosed in Japanese Patent Laid-Open Nos. 62(1987)-20125 and 5(1993)-74090, for instance. These prior art methods will be described hereinbelow with reference to FIGS. 1 to 3.

In FIG. 1, a magnetic disk 24 is being rotated in an arrow direction X, a magnetic head slider 100 is floated over the magnetic disk 24 with a minute gap therebetween due to the hydrodynamic force functioning between the two. In more detail, as shown in FIG. 2, the magnetic head slider 100 is formed with two slider rails 22a and 22b of the same shape on the side facing the magnetic disk 24. Further, as shown in FIG. 1, a symbol fh designates a hydrodynamic force generated by the above-mentioned hydrodynamic function.

Further, as shown in FIG. 1, a recording and reproducing head 20 for converting electric signals into magnetic signals corresponding thereto or vice versa (to record and reproduce data in and from the magnetic disk 24) is disposed at a rear end portion (the air flow outgoing end) of the slider rail 22a. Further, a contact end 21 for supplying a magnetic flux to the magnetic disk 24 is disposed extending toward the upper surface of the recording and reproducing head 20. During data recording and reproduction, the contact end 21 is brought into contact with the magnetic disk 24, so that a contact force fc is applied to the slider rail 22a. In the same way, another similar contact force fc is applied to the rear end of the slider rail 22b. Therefore, since the same hydrodynamic force fh and the same contact force fc are applied to the two slider rails 22a and 22b, it is possible to maintain the balance of the magnetic head slider 100 in the right and left directions.

In order to balance the magnetic head slider 100 in the front and rear directions, as shown in FIG. 1, a push force F is applied from a suspension (not shown) to an upper central position of the magnetic head slider 100. The direction of this push force F is opposite to the hydrodynamic force fh and the contact force fc applied to the two slider rails 22a and 22b from below. The push force F is applied to the magnetic head slider rails 22a and 22b via a pivot 23 formed on the suspension as a projection, located by a distance Ip away from the contact end 21.

Here, the pressure generated between the magnetic disk 24 and the slider rails 22a and 22b due to the hydrodynamic function is distributed as shown by a reference numeral 25 in FIG. 1. As shown, a large pressure peak exists on the front end side of the slider rails 22a and 22b and a small pressure peak exists on their rear end side. In this distribution pressure 25, the pressure center 26 (equivalent to a position where a unit hydrodynamic force fh is applied) exists at a position which is a distance Ih away from the contact end 21.

Further, as understood by FIG. 2, since the magnetic head slider 100 is of symmetrical shape with respect to the right and left direction (in the vertical direction in FIG. 2), it is possible to represent the distributed pressure in a two dimensional way as shown in FIG. 1, that is, the pressure is uniform in the direction perpendicular to the paper.

As described above, in the state where the magnetic head slider 100 is kept floating, the forces and moments of the three forces (i.e., the fluid bearing force fh, the contact force fc and the push force F) are well balanced as follows:

$$fc = \{(Ih-Ip)/Ih\} \times F \quad (1)$$

Under the construction as described above, as far as the pressure center 26 of the hydrodynamic force fh does not vary, the magnetic head slider 100 can stably follow the magnetic disk 24 without being disturbed by external disturbances such as vibration and unevenness of the magnetic disk 24. Under these conditions, it is possible to stably maintain the positional relationship between the contact end 21 and the magnetic disk 24 and thereby to minimize the flux fluctuations supplied from the contact end 21 to the magnetic disk 24.

In the prior art magnetic head slider, however, when the magnetic head slider 100 is moved in the radial direction of the magnetic disk 24 for recording and reproduction operation, the position Ih of the pressure center 26 varies due to the variation of the relative speed between the two. As a result, the contact force fc fluctuates according to the radial position of the magnetic disk 24 at which the magnetic disk slider 100 is placed on the magnetic disk 24, and the recording and reproducing apparatus is not well stabilized.

Further, as shown in FIG. 3, a gravity center, decided by an equivalent mass of the suspension at the position of the pivot 23 and a mass distribution of the magnetic head slider 100 lies between the position of the pivot 23 and a gravity center G of the magnetic head slider 100 itself. In FIG. 3, Ig denotes a distance between the gravity center G of the magnetic head slider 100 and the contact end 21. Here, when vibration of the magnetic disk 24 and fluctuations in the contact force fc due to an inertial force (e.g., a shock) applied to the apparatus are taken into account, an inertial force fg generated by the external vibration is applied to the gravity center G. Here, since the applied inertial force fg is balanced by the two forces of a fluctuation rate Δfc of the contact force fc and a fluctuation rate Δfh of the aerial force fh, the following expression can be established on the basis of the positional relationship of the applied forces.

$$\Delta fc \{(Ih-Ig)/Ih\} \times fg \quad (2)$$

In any of the two prior art apparatus as disclosed in Japanese Patent Laid-Open Nos. 62-20125 and 5-74090, (Ih−Ig)/Ih is 0.2 or more. This indicates that 20% or more of the inertial force fg generated by external vibration is applied as the fluctuation rate Δfc of the contact force fc. The above-mentioned fluctuation rate Δfc is a serious problem when a contact force between the magnetic disk 24 and the magnetic head slider 100 must be reduced for prevention of abrasion between the disk and head slider.

As described above, in the prior art apparatus, when the magnetic head slider is moved along the radial direction of the magnetic disk or when the inertial force fluctuates that is generated by vibration of the magnetic disk or by shock applied to the apparatus fluctuate, since the contact force between the magnetic disk and the magnetic head fluctuates, there exists a problem in that the recording and reproducing apparatus is not well stabilized.

SUMMARY OF THE INVENTION

With these problems in mind, therefore, it is the object of the present invention to provide a recording and reproducing head slider which can maintain the contact force stably between the data recording medium (i.e., magnetic disk) and the recording and reproducing head (i.e., magnetic head) without a large fluctuation in the contact force between the two, and further to provide the recording and reproducing apparatus using the same head slider.

To achieve the above-mentioned objective, the present invention provides a recording and reproducing head slider having a recording and reproducing head for recording and reproducing data in and from a data recording medium, comprising: a first slider rail provided facing the recording medium, the recording and reproducing head being fixed in the vicinity of an end of the first slider rail; a second slider rail having a surface facing the data recording medium and larger than a surface of the first slider rail, the first and second slider rails being arranged so that the recording and reproducing head slider is floated over the data recording medium by a hydrodynamic force; and an application of a push force toward the data recording medium, the application point being located at a position closer to the second slider rail than the first slider rail.

The recording and reproducing head slider may further include a projection formed at the application point of the push force.

The recording and reproducing head slider may further include a counter weight provided on a side opposite to the first slider rail with respect to the second slider rail so that a gravity center of the recording and reproducing head slider is located on the second slider rail.

The recording and reproducing head slider may further include a third slider rail provided on a side opposite to the second slider rail with respect to the counter weight.

Further, the present invention provides a recording and reproducing head slider having a recording and reproducing head for recording and reproducing data in and from a data recording medium, comprising: a main slider rail provided as facing the data recording medium; a first subsidiary slider rail having a surface facing the data recording medium and smaller than a surface of the main slider rail, the recording and reproducing head being fixed in the vicinity of an end of the first subsidiary slider rail; a first connecting portion for connecting the main slider rail and first subsidiary slider rail; a second subsidiary slider rail having a surface facing the data recording medium and larger than the surface of the first subsidiary slider rail; a second connecting portion having a rigidity higher than a rigidity of the first connecting portion, for connecting the main slider rail and second subsidiary slider rail, the main slider rail and the first and second subsidiary slider rails being arranged so that the recording and reproducing head slider is floated over the data recording medium by a hydrodynamic force; and an application point of application of a push force toward the data recording medium, the application point being located on the main slider rail.

The recording and reproducing head slider may further include a projection formed at the application point of the push force.

The main slider rail may have two slider rails provided as facing the data recording medium and parallel to each other.

Further, the present invention provides a recording and reproducing head slider having a recording and reproducing head for recording and reproducing data in and from a data recording medium, comprising: two main slider rails provided as facing the data recording medium and parallel to each other; two subsidiary slider rails, areas of which facing data recording medium being different from each other and smaller than areas of the main slider rails facing data recording medium, the recording and reproducing head being fixed in the vicinity of an end of one of the subsidiary slider rails having a smaller area facing the data recording medium; a connecting portion for connecting the main slider rails and the subsidiary slider rails, the main and subsidiary slider rails being arranged so that the recording and reproducing head slider is floated over the data recording medium by a hydrodynamic force; and an application point of a push force toward the data recording medium, the application point being located on the subsidiary slider rails with respect to the main slider rails.

The recording and reproducing head slider may further include a plate fixed on the main slider rails so that the main slider rails are situated in a same plane with respect to the data recording medium, the push force being applied toward the data recording medium through the plate.

Further, the present invention provides a recording and reproducing apparatus for recording and reproducing data in and from a data recording medium, comprising: a first slider rail provided as facing the data recording medium; a second slider rail having a surface facing the data recording medium and larger than a surface of the first slider rail; a recording and reproducing head fixed in the vicinity of an end of the first slider rail; means for driving the first and second slider rails so that the recording and reproducing head is floated over the data recording medium by a hydrodynamic force; and an application point of a push force toward the data recording medium, the application point being located at a position closer to the second slider rail than the first slider rail.

The recording and reproducing head slider may further include a projection formed at the application point of the push force.

The recording and reproducing head slider may further include a counter weight provided on a side opposite to the first slider rail with respect to the second slider rail so that a gravity center of the recording and reproducing head slider is located on the second slider rail.

The recording and reproducing head slider may further include a third slider rail provided on a side opposite to the second slider rail with respect to the counter weight.

Further, the present invention provides a recording and reproducing apparatus for recording and reproducing data in and from a data recording medium, comprising: a main slider rail provided as facing the data recording medium; a first subsidiary slider rail having a surface facing the data recording medium and smaller than a surface of the main slider rail; a first connecting portion for connecting the main and first subsidiary slider rails; a second subsidiary slider rail having a surface facing the data recording medium and larger than the surface of the main slider rail; a second connecting portion having a rigidity higher than the rigidity of the first connecting portion, for connecting the main and second subsidiary slider rails; recording and reproducing head fixed in the vicinity of an end of the first subsidiary slider rail; means for driving the main slider rail and the first and second subsidiary slider rails so that the recording and reproducing head floats over the data recording medium by a hydrodynamic force; and an application point of a push force toward the data recording medium, the application point being located on the main slider rail.

The recording and reproducing head slider may further include a projection formed at the application point of the push force.

The main slider rail may have two slider rails provided as facing the data recording medium and parallel to each other.

Further, the present invention provides a recording and reproducing apparatus for recording and reproducing data in and from a data recording medium, comprising: two main slider rails provided as facing the data recording medium and being parallel to each other; two subsidiary slider rails, areas of which facing data recording medium being different from each other and smaller than areas of the main slider rails facing data recording medium; a connecting portion for connecting the main slider rails and the subsidiary slider rails; a recording and reproducing head fixed in the vicinity of an end of one of the subsidiary slider rails having a smaller area facing the data recording medium; means for driving the main and subsidiary slider rails so that the recording and reproducing head floats over the data recording medium by a hydrodynamic force; and an application point of a push force toward the data recording medium, the application point being located on the subsidiary slider rails with respect to the main slider rails.

The recording and reproducing head slider may further include a plate fixed on the main slider rails so that the main slider rails are situated in a same plane with respect to the data recording medium, the push force being applied toward the data recording medium through the plate.

BRIEF DESCRIPTION OF THE DRAWINGS

FIG. 1 is a cross-sectional view showing the prior art recording and reproducing head slider, for assistance in explaining the balance of forces and moments applied thereto;

FIG. 2 is a back view showing the prior art recording and reproducing head slider;

FIG. 9 is a cross-sectional view, taken along the line B—B in FIG. 5;

FIG. 10 is an illustration for assistance in explaining a method of mounting the recording and reproducing head slider on a suspension;

FIG. 20 is a back view showing a fifth embodiment of the recording and reproducing head slider according to the present invention;

FIG. 21 is a side view showing the fifth embodiment of the recording and reproducing head slider according to the present invention;

FIG. 22 is a perspective view showing the fifth embodiment of the recording and reproducing head slider according to the present invention;

FIG. 23 is a cross-sectional view showing the fifth embodiment of the recording and reproducing head slider according to the present invention;

FIG. 38 is a perspective view showing the seventh embodiment of the recording and reproducing head slider according to the present invention;

FIG. 39 is a perspective view showing the projection formed on the main slider;

FIG. 52 is a perspective view showing a ninth embodiment of the recording and reproducing head slider according to the present invention;

FIG. 53 is an illustration for assistance in explaining the method of mounting the recording and reproducing head slider on the suspension;

FIG. 57 is a perspective view showing the same tenth embodiment of the recording and reproducing head slider according to the present invention;

FIG. 58 is a back view showing an eleventh embodiment of the recording and reproducing head slider according to the present invention;

FIG. 63 is a perspective view showing the twelfth embodiment of the recording and reproducing head slider according to the present invention.

DETAILED DESCRIPTION OF THE PREFERRED EMBODIMENTS

Figure 3:
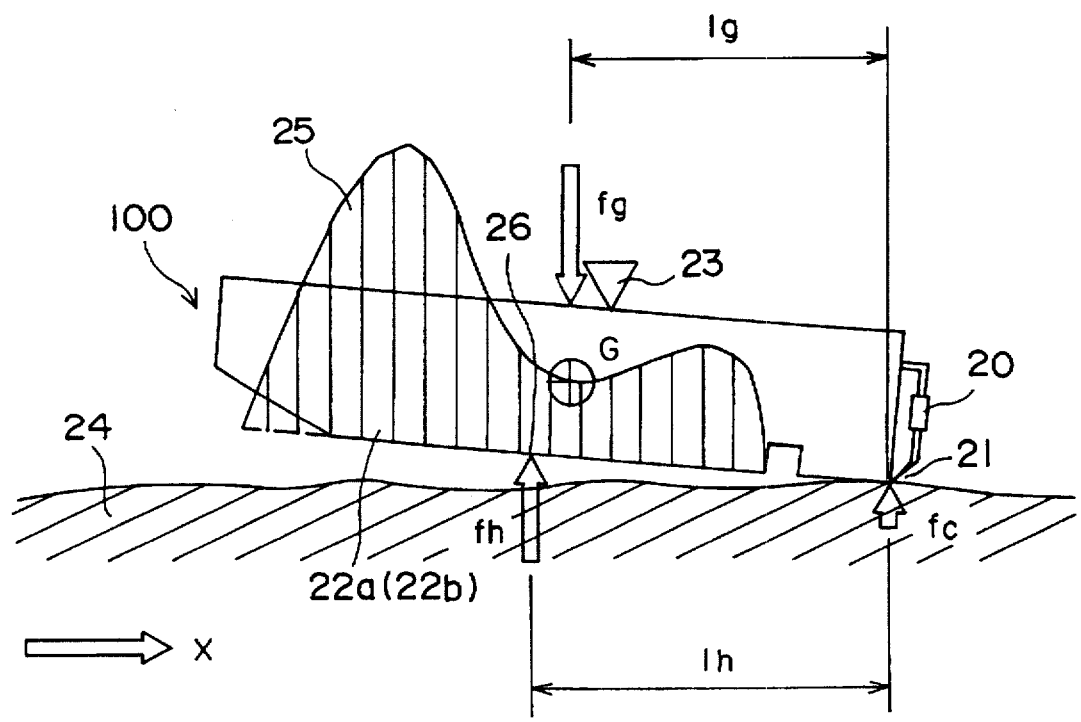
FIG. 3 is a cross-sectional view showing the prior art recording and reproducing head slider, for assistance in explaining the balance of an inertial force, a contact force, and a fluid bearing force applied thereto.

Preferred embodiments of the present invention will be described hereinbelow with reference to the attached drawings. Further, in the following embodiments, a magnetic head slider is explained as an example of the recording and reproducing head slider, and the magnetic disk apparatus is explained as the recording and reproducing disk apparatus.

First, a magnetic disk apparatus to which the magnetic head slider according to the present invention is applied will be described with reference to FIG. 4

A magnetic disk (recording medium) 101 in and from which data are recorded and reproduced is formed of a hard material and into a disk shape. The magnetic disk 101 is mounted on a spindle motor 102 and rotated at a constant rotational speed by the spindle motor. A magnetic head slider 1 is floated above the magnetic disk 101 with a minute gap between the surface of the disk 101 and the magnetic head. Here, the magnetic head slider 1 is mounted on an end of a suspension 104 formed of a metallic thin plate. Further, on the magnetic head slider 1, a magnetic head (not shown) is mounted to record and reproduce data in and from the magnetic disk.

The suspension 104 is fixed to an end of an arm 105 formed of a metal or a resin. To the other end of the arm 105, a coil bobbin (not shown) is attached, and a drive coil (also not shown) wound into a flat shape is fixed to this coil bobbin. Further, a magnetic circuit 106 having a permanent magnet and a yoke is disposed in such a way that the drive coil is interposed between the permanent magnet and the yoke in the vertical direction. The magnetic circuit 106 and the drive coil constitute a voice coil motor. Therefore, the arm 105 can be rotated or driven around a rotational axle 107 by a Lorentz's force generated by the magnetic flux of the magnetic circuit 106 and current flowing through the drive coil.

Here, the magnetic head is located on the magnetic disk 101 by means of a locating servo-system which reads servo data written in the magnetic disk 101 and then feedbacks the read servo data to the voice coil motor. That is, data can be recorded or reproduced in and from the magnetic disk 101, by adjusting current to be supplied to the drive coil through the locating servo-system, so that the position of the magnetic head can be controlled.

These elements required for the above operation are housed in a casing 108, together with electric parts (e.g., semiconductor devices) required for the locating servo-system. In addition, the magnetic disk apparatus is covered with a cover 109 formed of a metallic thin plate from above, so that the magnetic disk apparatus is constructed as an air-tight closed structure.

The magnetic disk apparatus constructed as described above can be coupled to a computer body (not shown) electrically via a terminal group 110 projecting from the casing 108 to the outside.

A first embodiment of the magnetic head slider 1 according to the present invention will be described hereinbelow with reference to FIGS. 5 to 7.

Figure 4:
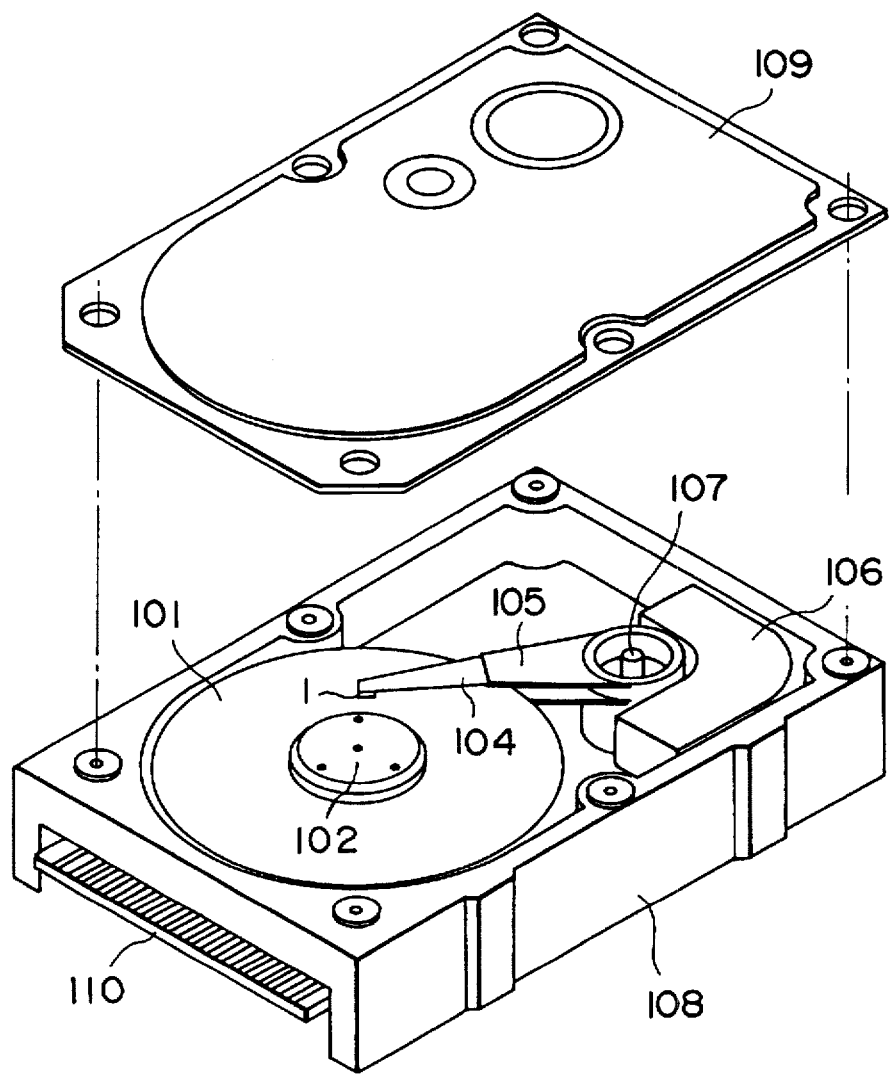
FIG. 4 is a perspective view showing an example of the magnetic disk apparatus to which the recording and reproducing head slider according to the present invention is applied.

The magnetic head slider 1 is formed into tapered flat shape such that a first slider rail 2 and a second slider rail 3 are arranged in parallel to each other on a side facing the upper surface of the magnetic disk 101 shown in FIG. 4. Near the rear end (i.e., air flow outgoing end) of the first slider rail 2, a recording and reproducing head 4 is attached to convert electric signals into magnetic signals or vice versa (i.e., to record and reproduce data in and from the magnetic disk 101). As the recording and reproducing head 4, an MR (magneto-resistant) head or an inductance head is used. Under the recording and reproducing head 4, a contact end 5 is formed to supply a magnetic flux onto the magnetic disk 101. Therefore, the magnetic head slider 1 can be brought into contact with the magnetic disk 101 via this contact end 5.

Further, the first and second slider rails 2 and 3 are formed integral with each other via joint 25 as part of the magnetic head slider 1 by processing a silicon wafer in accordance with an anisotropic etching, for instance. Further, the recording and reproducing head 4 is formed on the magnetic head slider 1 in accordance with deposition and etching process.

Figure 5:
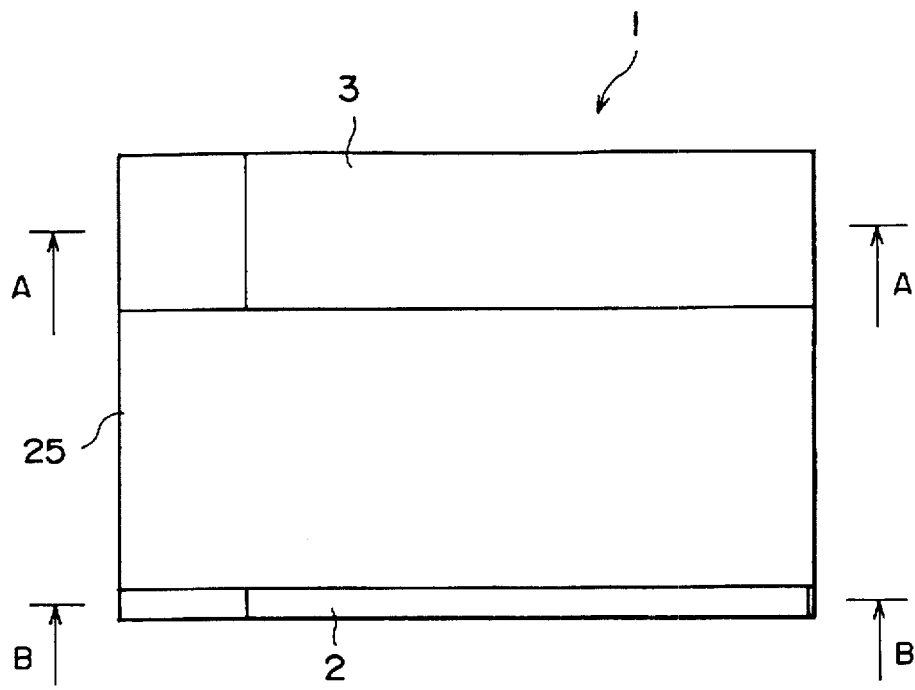
FIG. 5 is a back view showing a first embodiment of the recording and reproducing head slider according to the present invention.

As shown in FIG. 5, the first and second slider rails 2 and 3 are both formed into rectangular shapes in such a way that the width of the first slider rail 2 is a half or less the width of the second slider rail 3 (so that the area of the first slider rail 2 is less than a half of the area of the second slider rail 3). It is also applicable that the length of the first slider rail 2 is half or less the length of the second slider rail 3 so that the area of the first slider rail 2 is less than a half of the area of the second slider rail 3 (explained below). Accordingly, the magnetic head slider 1 is formed in such a way that the hydrodynamic force generated by the first slider rail 2 is sufficiently smaller than that generated by the second slider rail 3.

Figure 6:
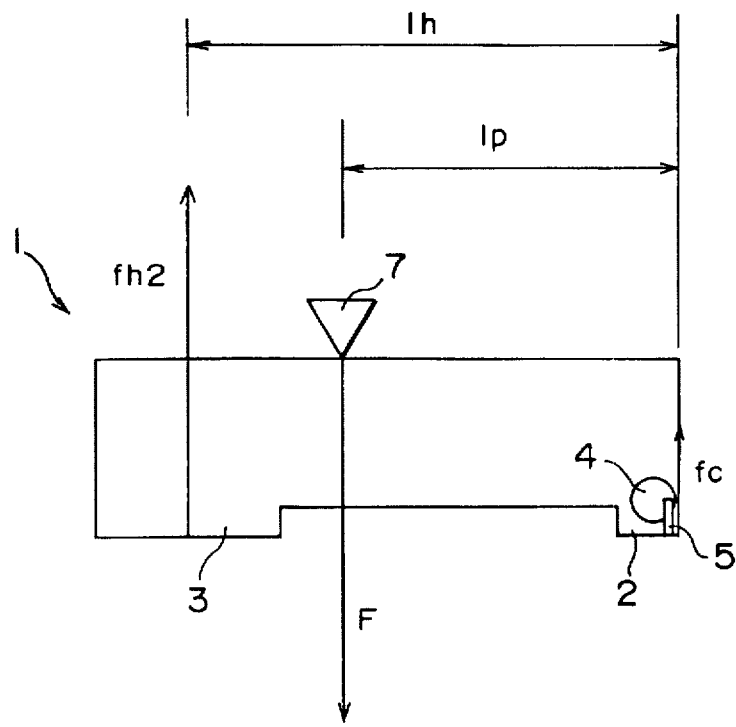
FIG. 6 is a cross-sectional view showing the first embodiment of the recording and reproducing head slider according to the present invention.

Further, as shown in FIG. 6, the magnetic head slider 1 is formed in such a way that a distance Ih between the side portion of the first slider rail 2 and the middle portion of the second slider rail 3 is larger than a distance Ip between a pivot position 7 (described later) and the side portion of the first slider rail 2.

Figure 8:
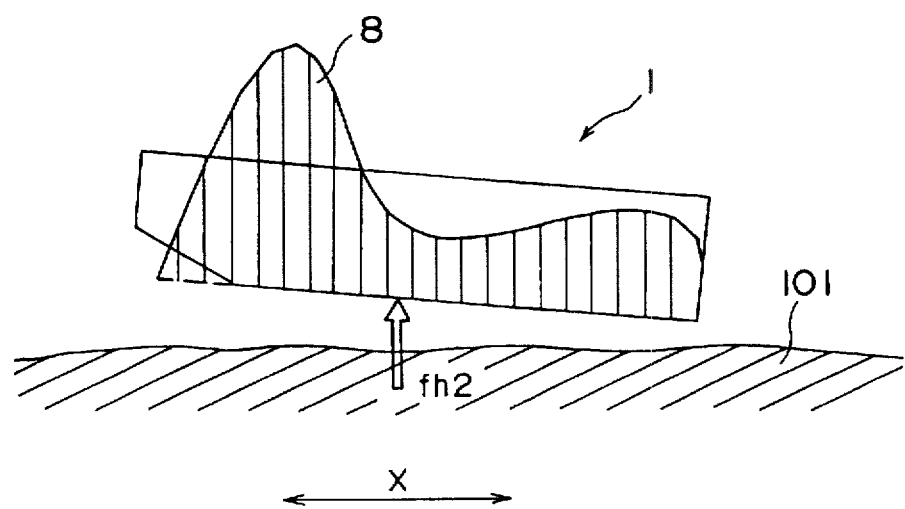
FIG. 8 is a cross-sectional view, taken along the line A—A in FIG. 5.

Here, when seen from the side surface of the magnetic head slider 1, a pressure 8 is distributed on the second slider rail 3 as shown in FIG. 8 (i.e., a cross-sectional view taken along the line A—A in FIG. 5). The distributed pressure 8 is equivalent to a force fh2 centralized to the second slider rail 3, as shown by an arrow in FIG. 8. In this case however, since the distributed pressure 8 is dependent upon the relative speed between the magnetic head slider 1 and the magnetic disk 101, the force fh2 is slightly shiftable in the X direction in FIG. 8. On the other hand, the position at which the hydrodynamic force fh2 is applied when seen in FIG. 6 is not dependent upon the relative speed therebetween and thereby is always located at roughly the middle position of the second slider rail 3.

On the other hand, as shown in FIG. 9 (i.e., a cross-sectional view taken along the line B—B in FIG. 5), a distributed pressure 9 generated at the first slider rail 2 is comparatively smaller than the distributed pressure 8 generated at the second slider rail 3. The distributed pressure 9 is equivalent to a hydrodynamic force fh1 centralized to the first slider rail 2, as shown by an arrow in FIG. 9. Further, the first slider rail 2 receives a contact force fc (a reaction force from the magnetic disk 101) at a contact end 5, also as shown in FIG. 9.

Figure 7:
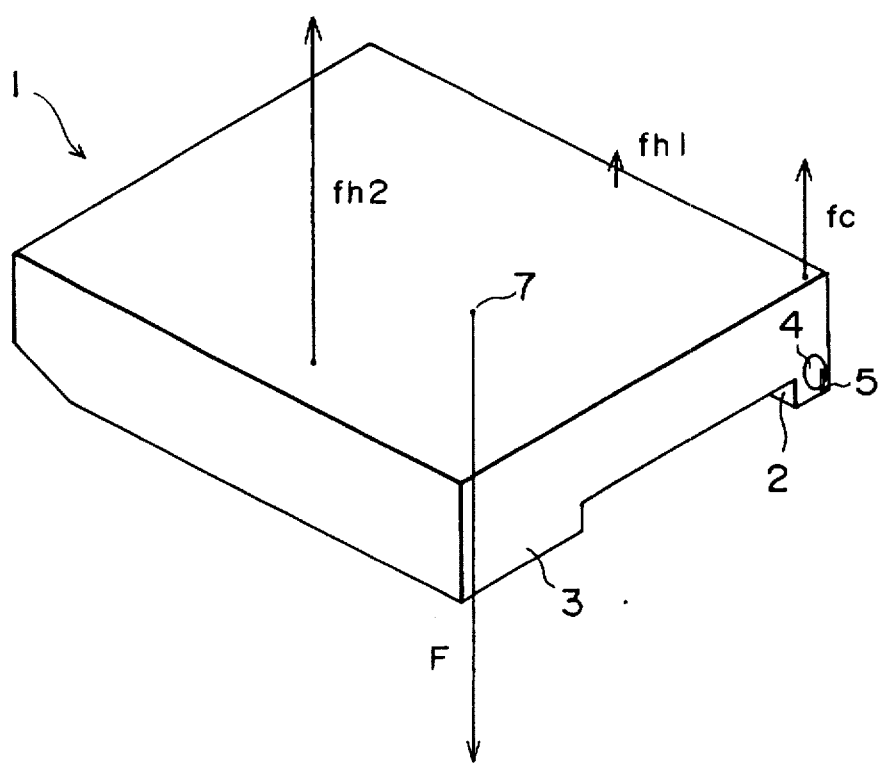
FIG. 7 is a perspective view showing the first embodiment of the recording and reproducing head slider according to the present invention.

All the forces applied to the magnetic head slider 1 (i.e., the hydrodynamic forces fh1 and fh2, the contact force fc, and the push force F at a pivot 7) are balanced as shown in FIG. 7. As a result, the contact force fc can be obtained on the basis of the above-mentioned balancing condition. In the first embodiment, since the width of the first slider rail 2 is formed to be half or less than that of the width of second slider rail 3 as already explained, the hydrodynamic force fh1 applied to the first slider rail 2 is sufficiently smaller than the force fh2 applied to the second slider rail 3. Therefore, it is possible to neglect the hydrodynamic force fh1 applied to the first slider rail 2, so that the contact force fc can be obtained by the balancing condition of the hydrodynamic force fh2, the contact force fc, and the push force F. In other words, the balancing condition of the magnetic head slider 1 can be determined on the basis of the force balancing condition obtained when seen in FIG. 6.

As already described, since the hydrodynamic force fh2 obtained when seen in FIG. 6 is independent of the relative speed between the magnetic head slider 1 and the magnetic disk 101, the following relationship can be obtained:

$$fc=\{(Ih-Ip)/Ih\}\times F \quad (3)$$

Here, the position at which the pivot 7 is formed is shifted toward the second slider rail 3. Accordingly, the contact force fc is a constant value obtained by reducing the push force F applied by the suspension 104 at a ratio of (Ih−Ip)/Ih.

In the conventional case, as shown in FIG. 1, when the hydrodynamic force fh is shifted, since the push force F is located in the vicinity of the force fh, the push force F largely fluctuates. In the present invention, however, in order to reduce the obtained contact force fc, there exists an advantage that the push force F does not fluctuate. This is because the position at which the push force F is applied by the suspension is determined in the vicinity of the second slider rail 3, even if the relative speed between the magnetic head slider 1 and the magnetic disk 101 varies. As a result, it is possible to have a small contact force fc while setting a large distance Ih freely.

Here, the position of the pivot 7 will be described hereinbelow.

As shown in FIG. 10, a gimbals 10 is mounted on an end of the suspension 104. Further, the magnetic head slider 1 is fixed to an end of the gimbals 10 by means of a bonding agent. The gimbals 10 is a metallic flat spring fixed to the suspension 104 so as to be arranged roughly in parallel to the surface of the magnetic disk 101. Therefore, the gimbals 10 is constructed in such a way as that it is sufficiently rigid in the in-plane direction of the magnetic disk 101 but deformable in the oblique and bending directions (in the perpendicular direction) of the magnetic disk 101.

Figure 11A:
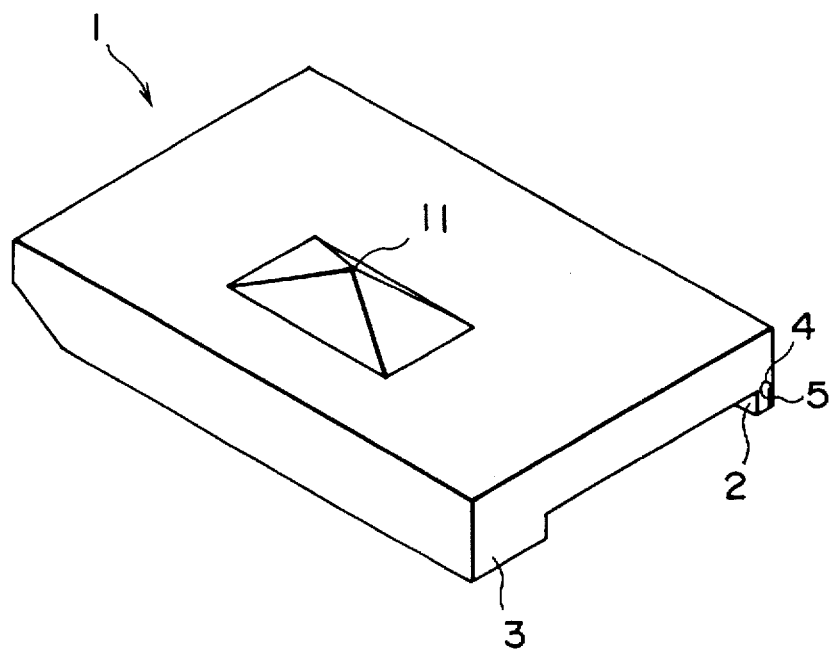
FIG. 11A is a perspective view showing a projection formed in the recording and reproducing head slider.
Figure 12:
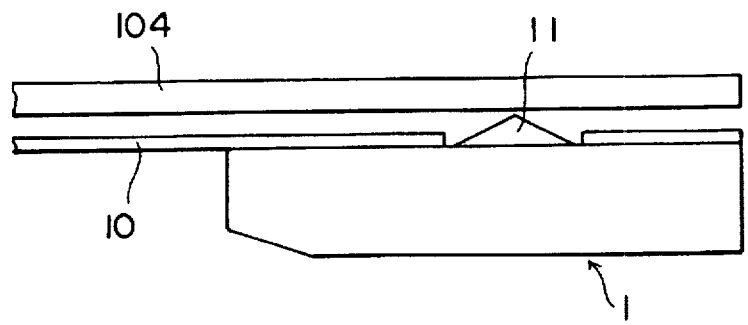
FIG. 12 is a cross-sectional view showing the projection formed on the recording and reproducing head slider.
Figure 13:
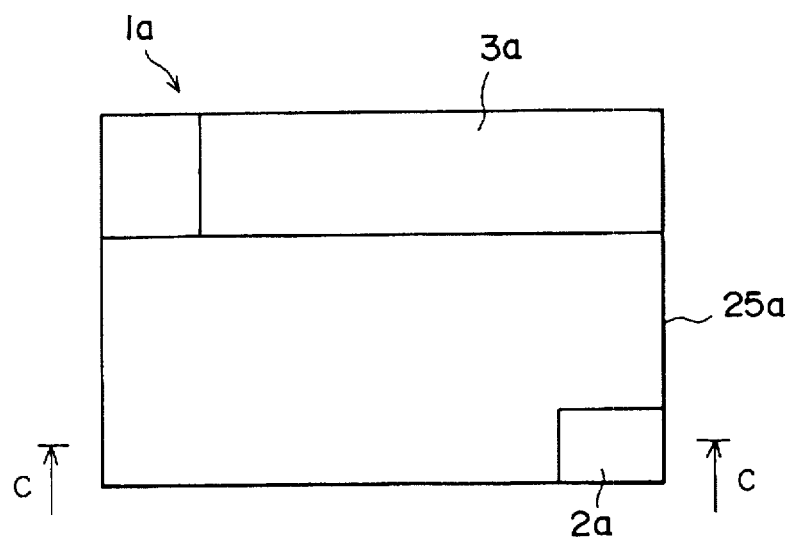
FIG. 13 is a back view showing a second embodiment of the recording and reproducing head slider according to the present invention.
Figure 14:
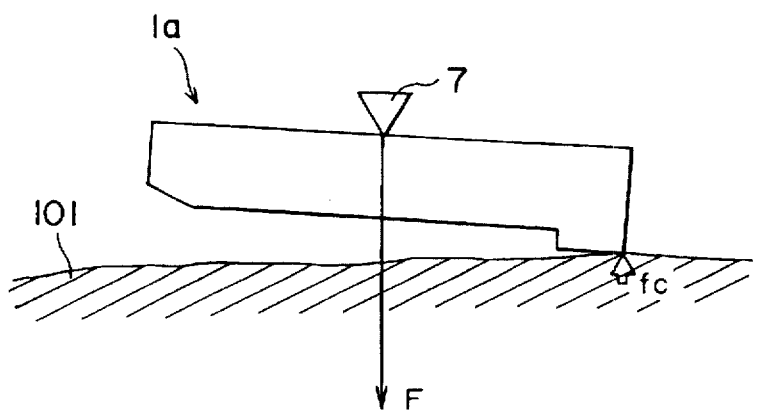
FIG. 14 is a cross-sectional view showing the same second embodiment, taken along the line C—C in FIG. 13.

As shown in FIG. 11A, a projection 11 is formed integral with the magnetic head slider 1 and located at a position closer to the second slider rail 3 than the first slider rail 2, on the opposite side of the magnetic head slider 1 to the magnetic disk 101. The projection 11 is formed into a roughly pyramid shape, with its apex corresponding to the position of the pivot 7. Further, as shown in FIG. 12, a predetermined push force F is applied to the magnetic head slider 1 by an end of the suspension 104 via the end (apex) portion of the projection 11.

In the construction as described above, since the push force F of the suspension 104 is applied to the magnetic head slider 1 only at the end of the projection 11, the position of the push force F depends upon only the end position of the projection 11, irrespective of the mounting positions of the suspension 104, the gimbals 10 and the magnetic head slider 1. Conventionally, since such a projection is formed on the suspension, the push force position depends on the mounting position of the suspension, etc.

Further, since the projection 11 can be formed integral with the magnetic head slider 1 by an etching process during the manufacturing process of the magnetic head slider 1, a high precision pivot position 7 can be obtained, with the result that it is possible to set the contact force fc precisely.

Figure 11B:
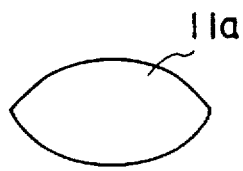
FIG. 11B is a perspective view showing another projection formed in the recording and reproducing head slider.

Further, without being limited only to the pyramid shape, the same effect can be obtained when a semi-spherical projection 11a is formed, as shown in FIG. 11B.

As described above, according to the present invention, it is possible to maintain the contact force between the magnetic disk and the magnetic head without fluctuations, with the result that the contact condition therebetween can be maintained stably. This is possible even when the magnetic head slider moves on the magnetic disk in the radial direction thereof or when an inertial force applied to the magnetic head slider changes due to vibration of the magnetic disk or a shock applied to the magnetic recording and reproducing apparatus.

Further, under the condition that the first slider rail 2 is extremely close to the magnetic disk 101, it is considered that an interatomic force is generated between both the surfaces of the first slider rail 2 and the magnetic disk 101. The interatomic force generated between the two is a minute repellent force which separates the first slider rail 2 and the magnetic disk 101 away from each other. Therefore, when a force opposite to this repellent force is generated, it is possible to maintain a balance against the generated interatomic force.

Therefore, in the case where the gap distance between the magnetic head slider and the magnetic disk is reduced down to such a minute value that the interatomic force is generated, it is preferable to correct the contact force fc in anticipation of this interatomic force, and to consider the balance of the moments and the forces by use of the push force F determined according to the corrected contact force.

The measurement value of the interatomic force is 50 mg when a probe with a diameter of about 0.5 mm is used and 10 mg when a probe with a diameter of about 2 μm is used. Therefore, on the basis of the measurement of a pressure on the order of several mg, it is possible to control not only the gap distance and the contact force between the first slider rail and the magnetic disk, but also to maintain an extremely minute gap between the two under a non-contact condition (even if there exists an interatomic force that is generated between the two). As a result, it is possible to control the floating condition between the first slider rail and the magnetic disk, while preventing the wear between the first slider rail and the magnetic disk.

A second embodiment of the magnetic head slider according to the present invention will be described hereinbelow with reference to FIGS. 13 to 15B. In the following respective embodiments, the same reference numerals have been retained for the similar elements or parts which have the same functions as with the case of the first embodiment, without repeating the similar description.

In the first embodiment, the width of the first slider rail 2 is narrower than the width of second slider rail 3 to reduce the hydrodynamic force generated by the first slider rail 2 on which the recording and reproducing head 4 is provided. In contrast with this, in this second embodiment, the length of a first slider rail 2a is shorter than that of a second slider rail 3a to obtain the similar effect as with the case of the first embodiment.

In more detail, since the length of the first slider rail 2 is shorter than the length of the second slider rail 3a, it is possible to reduce the hydrodynamic force fh1 to a sufficiently small amount, as compared with fh2 of the second slider rail 3a. In other words, in this second embodiment, since the hydrodynamic force fh1 of the first slider rail 2 can be neglected, it is possible to decide the contact force fc on the basis of the balance of the hydrodynamic force fh2, the contact force fc, and the push force F.

Further, the above-mentioned effect can be obtained by determining the area of the surface of the first slider rail facing a magnetic disk to a value smaller than that of the second slider rail by making narrower the width or making shorter the length of the first slider rail than that of the second slider rail. In this case, the shapes of the surfaces of both the first and second slider rails can be made into any shapes, without being limited to only rectangular shapes.

Figure 15A:
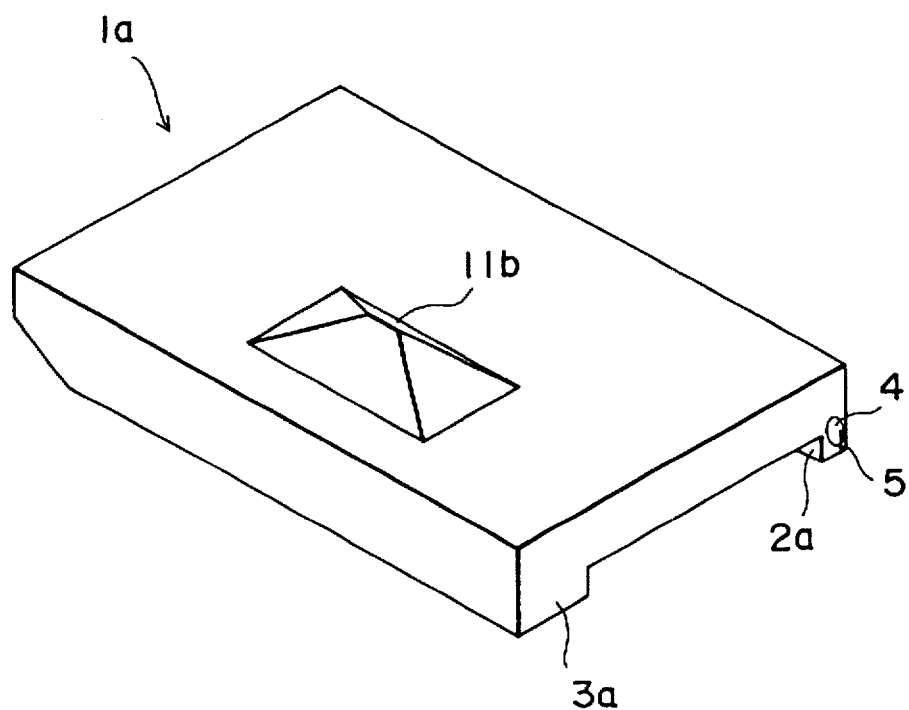
FIG. 15A is a perspective view showing the second embodiment of the recording and reproducing head slider according to the present invention.
Figure 15B:
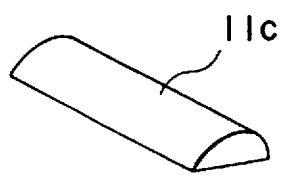
FIG. 15B is a perspective view showing only the projection formed on the head slider.

Further, in the first embodiment, the projection 11 for deciding the position of the pivot 7 is formed into roughly a pyramid shape as shown in FIG. 11A. In this second embodiment, however, a projection 11b is formed into an elongated pyramid shape extending in the longitudinal direction of the second slider rail 3a, as shown in FIG. 15A. Therefore, the apex of the projection 11b for deciding the position of a pivot 7 of FIG. 14 extends also in the longitudinal direction of the second slider rail 3a. In this elongated shape it is possible to reduce wear at the apex of the projection 11b and further to prevent the apex from being damaged due to a shock applied to the magnetic head slider.

Further, since the apex of the projection 11b is long, although the position of the pivot tends to be shifted in the longitudinal direction thereof, since the position of the pivot 7 is always kept fixed at a point when seen from the longitudinal direction (the same as the air flow direction), the ratios among the push force F, the hydrodynamic force fh2 of the second slider rail 3a and the contact force fc of the first slider rail 2a are hardly subjected to the influence of the elongated apex projection 11b, so that the afore-mentioned equation (3) can be established in this second embodiment.

Further, the same effect as discussed above can be obtained semi-cylindrical projection 11c is formed, as shown 15B.

Figure 16:
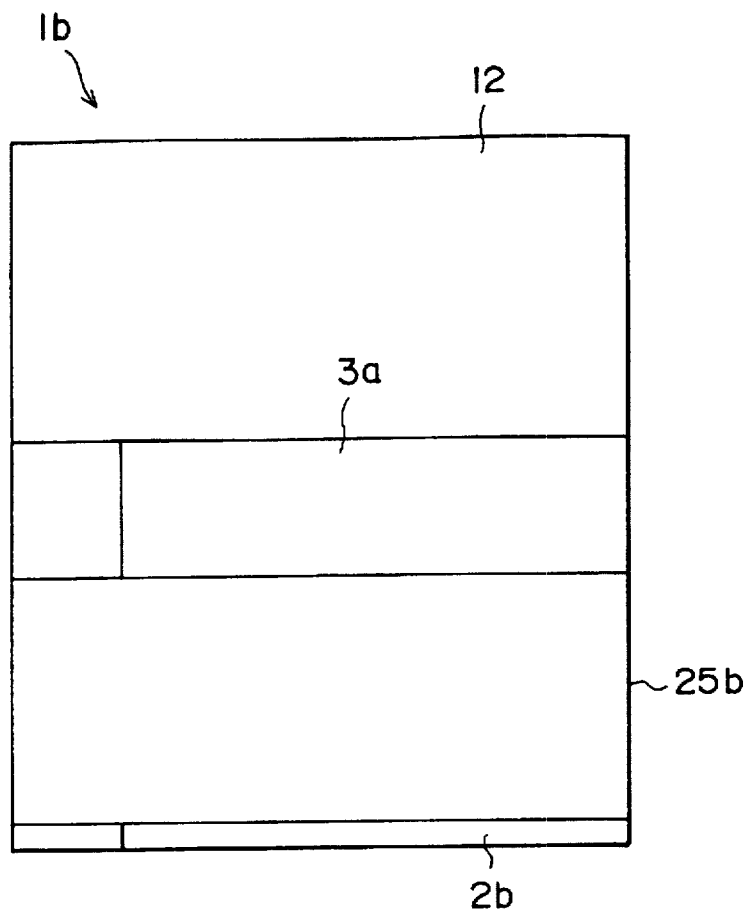
FIG. 16 is a back view showing a third embodiment of the recording and reproducing head slider according to the present invention.
Figure 17:
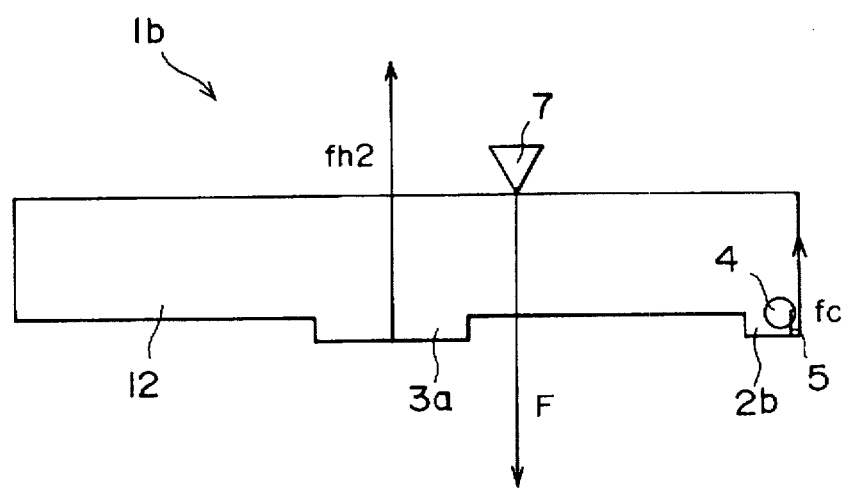
FIG. 17 is a cross-sectional view showing the third embodiment of the recording and reproducing head slider according to the present invention.

A third embodiment of the magnetic head slider according to the present invention will be described hereinbelow with reference to FIGS. 16 and 17.

This third embodiment is different from the first and second embodiments in the shape of a magnetic head slider 1b; that is, a counter weight 12 is provided on the side opposite to a first slider rail 2b with respect to a second slider rail 3a. Further, the counter weight 12, the first and second slider rails 2b and 3a can be all formed integrally with each other through an etching process.

In this third embodiment, the magnetic head slider 1b is so constructed that the gravity center of the entire magnetic head slider 1b is located roughly on the second slider rail 3a, by additionally providing the counter weight 12.

In the magnetic head slider constructed as described above, when a shock is applied to the entire apparatus, since an inertial force generated by the shock (i.e., acceleration) is applied onto the second slider rail 3a (on which the gravity center exists), when the force balancing condition is taken into account, all the forces to be balanced with the applied shock are generated only on the second slider rail 3a. As a result, even if a shock is applied to the apparatus from the outside, the contact force fc of FIG. 17 will not fluctuate, so that there exists an advantage such that the life time of the recording and reproducing head 4 can be lengthened.

Figure 18:
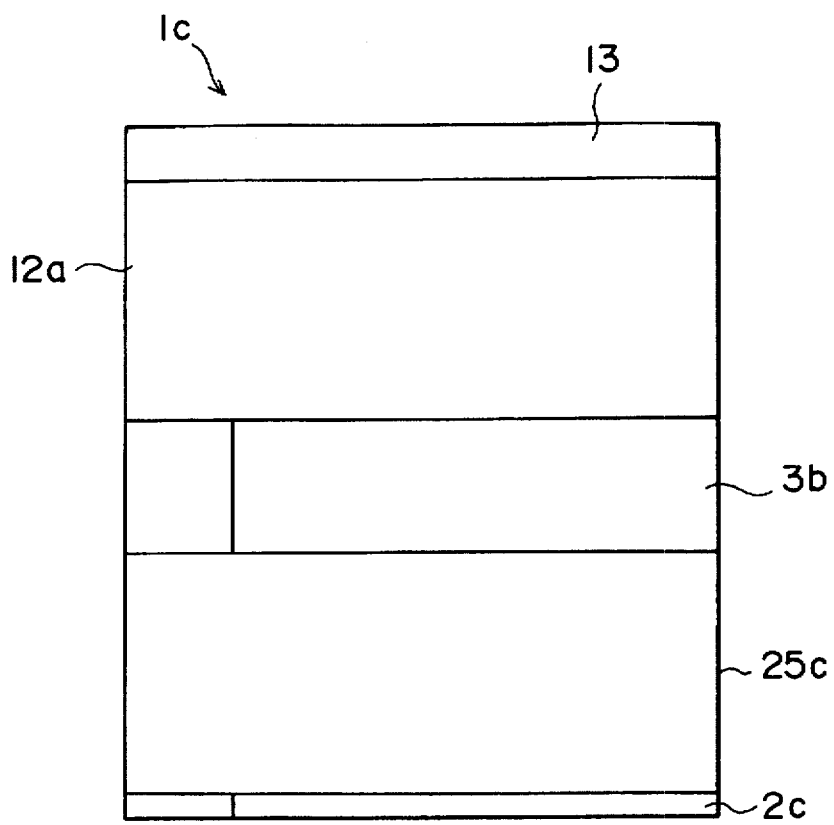
FIG. 18 is a back view showing a fourth embodiment of the recording and reproducing head slider according to the present invention.
Figure 19:
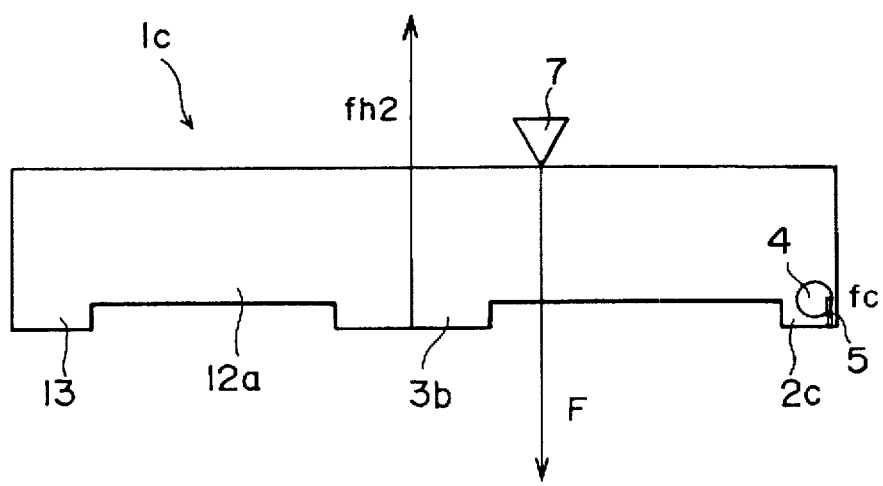
FIG. 19 is a cross-sectional view showing the fourth embodiment of the recording and reproducing head slider according to the present invention.

A fourth embodiment of the magnetic head slider according to the present invention will be described hereinbelow with reference FIGS. 18 and 19.

This fourth embodiment is different from the third embodiment in that a third slider rail 13 is additionally provided at an end of a counter weight rail 12a. The surface of the third slider rail 13 is finished in the same way as with the case of first and second slider rails 2c and 3b. However, the width and the length of the third slider rail 13 can be determined in values other than that as shown in FIG. 18.

In this fourth embodiment, since the third slider rail 13 is provided on the side of the counter weight rail 12a, it is possible to prevent the counter weight rail 12a from being directly brought into contact with the surface of the magnetic disk 101. This is possible in case the relationship among the push force F, the hydrodynamic force fh2 generated by the second slider rail 3b, and the contact force fc of the first slider rail 2c are unbalanced. As a result, there exist such practical effects that the possibility of damage of the data recorded in the magnetic disk 101 can be reduced to be extremely small and further the life time of a magnetic head slider 1c can be lengthened.

A fifth embodiment of the magnetic head slider according to the present invention will be described hereinbelow with reference to FIGS. 20 to 22.

This fifth embodiment is largely different from the above-mentioned embodiments in construction. A magnetic head slider 31 is provided with a main slider rail 32 at the central portion thereof, a first subsidiary slider rail 34 connected to the main slider rail 32 via a first connecting beam 33 on one side thereof, and a second subsidiary slider rail 36 connected to the main slider rail 32 via a second connecting beam 35 on the other side thereof. Here, the rigidity of the first connecting beam 33 is lower than that of the second connecting beam 35. For instance, as shown in FIG. 20, the thickness of the first connecting beam 33 is thin and further the shape thereof is formed in such a way that a hollow portion is formed partially. On the other hand, the rigidity of the second connecting beam 35 is determined to the same extent as that of the first and second subsidiary slider rails 34 and 36.

Further, the width (or the area) of the second subsidiary slider rail 36 is wider (or broader) than that of the first subsidiary slider rail 34, and further the width (or the area) of the main slider rail 32 is wider (or broader) than that of the second subsidiary slider rail 36.

In more detail, the width or the area of the first subsidiary slider rail 34 is determined to be less than a half of that of the second subsidiary slider rail 36 in such a way that the fluid bearing force generated by the first subsidiary slider rail 34 is sufficiently smaller than that generated by the second subsidiary slider rail 36. Further, the width or the area of the second subsidiary slider rail 36 is determined to be less than a half of that of the main slider rail 32 in such a way that the fluid bearing force generated by the second subsidiary slider rail 36 is sufficiently smaller than that generated by the main slider rail 32.

Further, a recording and reproducing head 4 and a contact end 5 are arranged in the vicinity of the rear end of the first subsidiary slider rail 34.

Further, as shown in FIG. 21, the position of the pivot 7 of the magnetic head slider 31 is located on the main slider rail 32. In FIG. 21, the distance l1 between the pivot (7) position and the outer side of the first subsidiary slider rail 34 is made longer than the distance l2 between the pivot (7) position and the middle portion of the second subsidiary slider rail 36.

Further, the main slider rail 32, the first subsidiary slider rail 34, and the second subsidiary slider rail 36 are all formed integral with each other through an etching process, for instance. Further, the recording and reproducing head 4 is formed on the magnetic head slider 31 in accordance with a deposition and etching process.

Here, when seen equivalently, the pressure distribution generated by the second subsidiary slider rail 36 can be represented by a centralized force fh2 as shown in FIG. 23, in the same way as with the case of the first embodiment (shown in FIG. 8). Further, being dependent upon the relative speed between the magnetic head slider 31 and the magnetic disk 101, the pressure distribution is shifted in the X direction shown in FIG. 20. However, the position of the fluid bearing force fh2 obtained when seen from the direction shown in FIG. 23 is always fixed at the central position of the second subsidiary slider rail 36, without being dependent upon the relative speed.

On the other hand, the pressure distribution generated by the first subsidiary slider rail 34 is very small as compared with that generated by the second subsidiary slider rail 36; that is, an equivalently slight fluid bearing force fh1 is generated. Further, the first subsidiary slider rail 34 receives a contact force fc (the reaction force) from the magnetic disk 101 at the contact end 5.

Further, the pressure distribution generated by the main slider rail 32 is equivalently the same as a centralized fluid bearing force fhm applied to the main slider rail 32.

Figure 24:
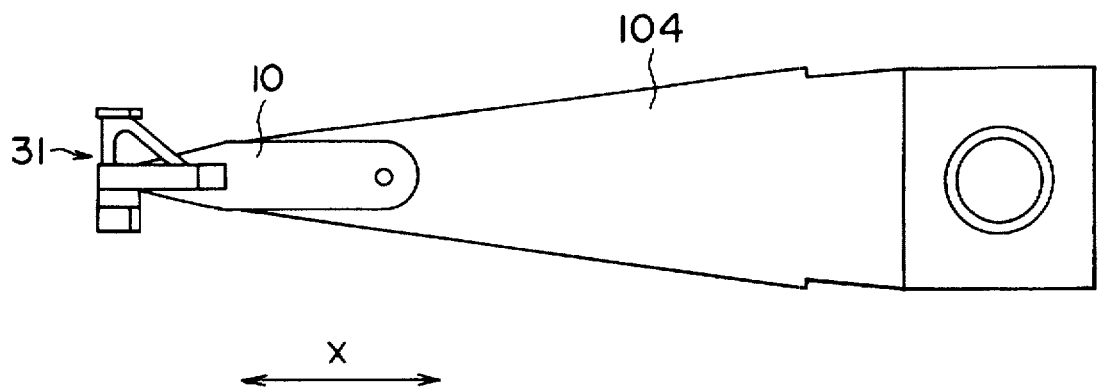
FIG. 24 is an illustration for assistance in explaining the method of mounting the recording and reproducing head slider on the suspension.
Figure 25:
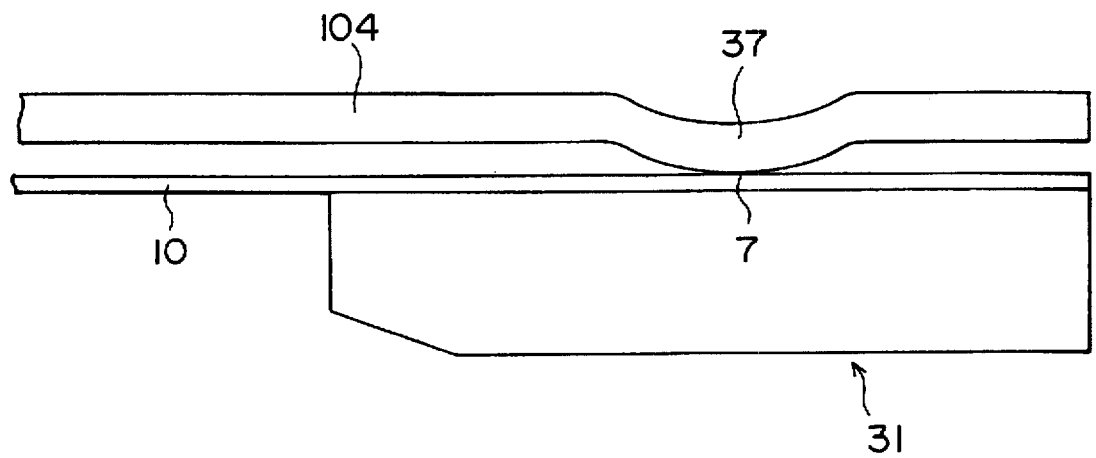
FIG. 25 is a cross-sectional view showing the projection formed on the suspension.

FIGS. 24 and 25 show the method of mounting the magnetic slider 31 on a suspension 104. In more detail, a gimbals 10 is mounted on an end of the suspension 104, and the magnetic head slider 31 is fixed to an end of the gimbals by means of a bonding agent.

In the above-mentioned respective embodiments, a projection is formed integral with the magnetic head slider. In this fifth embodiment, however, a projection 37 is formed on the side of the suspension 104 in order to apply a predetermined push force F at the position of the pivot 7, that is, to the main slider rail 32. As shown in FIG. 25, the projection 37 is formed by plastically deforming the metallic suspension 104 into a circular arc shape in the cross section. Without being limited only to the circular arc shape, however, it is possible to form the projection into a triangular shape in the cross section.

In the construction as described above, the push force F of the suspension 104 is applied only at the end of the projection 37, and further the position of the push force F is determined by only the end position of the projection 37, irrespective of the mounting positions of the suspension 104, the gimbals 10, and the magnetic head slider 31.

In the fifth embodiment, it is possible to balance all the forces applied to the magnetic head slider 31 (i.e., the hydrodynamic forces fhm, fh1, fh2, the contact force fc, and the push force F). Further, it is possible to obtain the contact force fc on the basis of the force balancing conditions. Here, since the area of the main slider rail 32 is sufficiently larger than those of the first and second subsidiary slider rails 34 and 36, when a floating distance of the main slider rail 32 is determined as dm as shown in FIG. 23, it is possible to determine this dm on the basis of only the balance between the hydrodynamic force fhm and the push force F. Further, as shown in FIG. 23, a virtual rotative center 38 can be decided to be at a position dm distance away from the surface of the magnetic disk 101 at the middle portion of the main slider rail 32. A rotational angle θ of the magnetic head slider 31 around this virtual rotational center 38 becomes a parameter required to determine the posture (inclination status) of the magnetic head slider 31.

Here, the rotational angle θ can be determined on the basis of the force balance among the hydrodynamic force fh1 and the contact force fc generated by the first subsidiary slider rail 34 and the fluid bearing force fh2 generated by the second subsidiary slider rail 36.

Here, since the area of the first subsidiary slider rail 34 is sufficiently smaller than that of the second subsidiary slider rail 36, the hydrodynamic force fh1 generated by the first subsidiary slider rail 34 is small to such an extent as to be disregarded, as compared with that fh2 generated by the second subsidiary slider rail 36, and therefore neglected. Therefore, the contact force fc can be expressed following equation.

$$fc = (l2/l1) \times fh2 \quad (4)$$

Here, it should be noted that the contact force fc is a constant value obtained by reducing the hydrodynamic force fh2 generated by the second subsidiary slider rail 36 in a ratio of (l2/l1).

Figure 26:
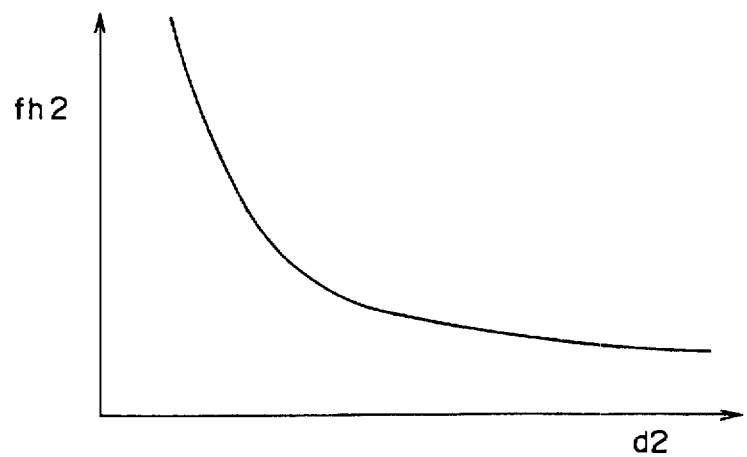
FIG. 26 is a graphical representation showing the relationship between the floating distance d2 and the hydrodynamic force fh2.

Here, a parameter for deciding the hydrodynamic force fh2 generated by the second subsidiary slider rail 36 will be taken into account. Here, FIG. 26 shows the relationship between a floating distance d2 of the second subsidiary slider rail 36 and the hydrodynamic force fh2. FIG. 26 indicates that the fluid bearing force fh2 decreases with increasing floating distance d2.

Further, the rotational moment M2 generated by the floating distance d2 and the fluid bearing force fh2 around the virtual rotational center 38 can be expressed as $$M2 = fh2 \times l2 \quad (5)$$

Figure 27:
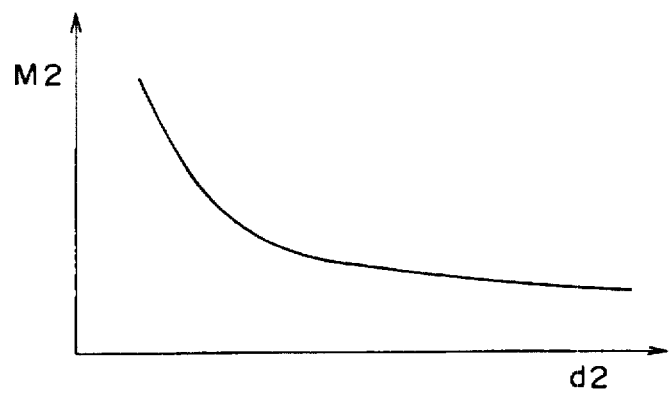
FIG. 27 is a graphical representation showing the relationship between the floating distance d2 and the rotational moment M2.

Further, the relationship as shown by FIG. 27 can be established between the floating distance d2 and the rotational moment M2 on the basis of the equation (5) and FIG. 26.

Since the floating distance dm of the main slider rail 32 of the magnetic head slider 31 can be decided unequivocally, the virtual rotational center 38 can be fixed at a constant position. Accordingly, when the inclination angle is small, the relationship between the floating distance d2 of the second subsidiary slider rail 36 and the displacement distance dc at the contact end 5 due to bending deformation of the first connecting beam 33 can be approximated as follow:

$$dc = \{(d2-dm)/l2\} \times l1 - dm = (l1/l2) \times d2 - \{(l1+l2)/l2\} \times dm \quad (6)$$

Figure 28:
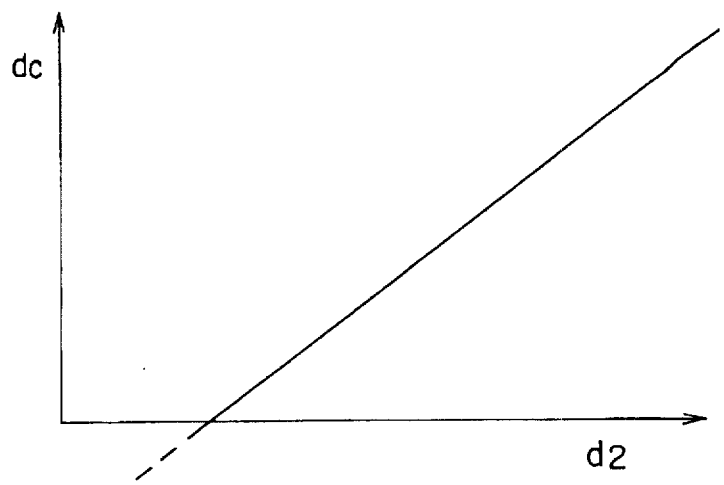
FIG. 28 is a graphical representation showing the relationship between the floating distance d2 and the displacement distance dc.

Further, the relationship as expressed by equation (6) is linear as shown by FIG. 28.

However, the equation (6) is effective only when the displacement rate dc is positive. In other words, in equation (6), if dc is negative, this indicates that the contact end 5 is not in contact with the magnetic disk 101 in practice. In this case, therefore, an absolute value of dc indicates the floating distance from the magnetic disk 101.

Figure 29:
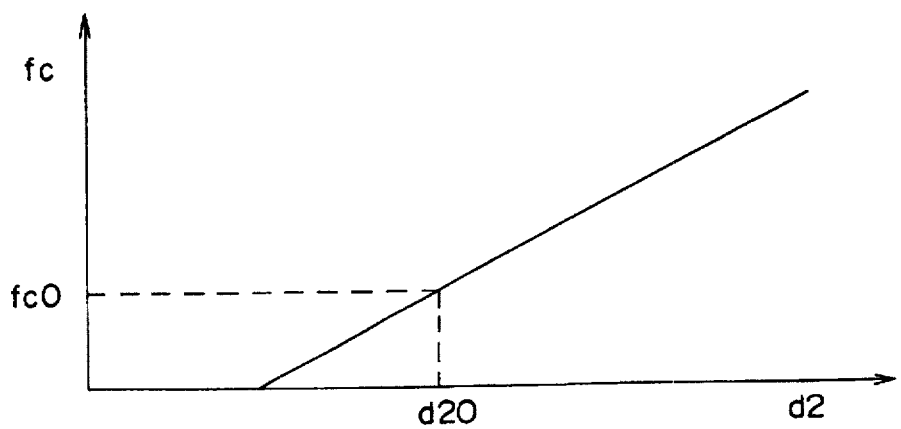
FIG. 29 is a graphical representation showing the relationship between the floating distance d2 and the contact force fc.

Further, when the contact end 5 is displaced by a displacement distance dc relative to the first connecting beam 33, a contact force fc is generated toward the magnetic disk 101 by a distortion of the first connecting beam 33. Here, the relationship between this contact force fc and the displacement distance dc can be expressed as $$fc = k \times dc \quad (7)$$

where k denotes a spring constant in the bending direction of the first connecting beam 33, which is a constant decided by the material and shape of the first connecting beam 33. Further, the relationship as shown in FIG. 29 can be established on the basis of equation (7) and FIG. 28.

Figure 30:
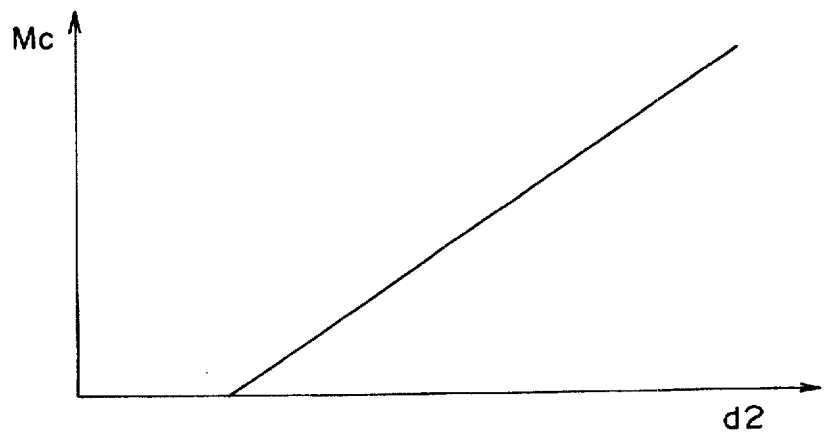
FIG. 30 is a graphical representation showing the relationship between the floating distance d2 and the rotational moment Mc around a virtual rotational center.

On the basis of the above-mentioned facts, the relationship between the floating distance d2 of the second subsidiary slider rail 36 and the rotational moment Mc around the virtual rotational center 38 generated by the displacement distance dc at the contact end 5 is represented as in FIG. 30.

Figure 31:
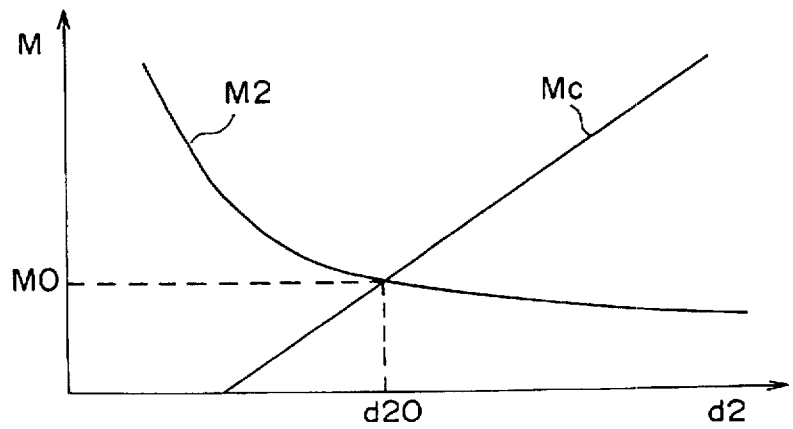
FIG. 31 is a graphical representation showing the relationship between the floating distance d2 and the rotational moment M.

Further, on the basis of the relationship between FIG. 27 and FIG. 30, the floating distance d2 of the second subsidiary slider rail 36 can be decided unequivocally as shown in FIG. 31. Then, when the floating distance of the second subsidiary slider rail 36 is d20, the contact force fc0 of the first subsidiary slider rail 34 can be decided unambiguously on the basis of FIG. 29.

In other words, the contact force fc can be decided in dependence upon only the spring rigidity of the first connecting beam 33 and the shape (i.e., area) of the second subsidiary slider rail 36, without being subjected to the influence of the push force F applied to the position of the pivot 7. Accordingly, there exists such a practically great advantage that it is possible to suppress to an extremely small amount the dispersion of the contact force fc caused by the assembly error of the magnetic head slider 31.

Further, the gravity center G of the magnetic head slider 31 roughly matches the application position of the fluid bearing force fhm of the main slider rail 32. The contact force fc thus hardly changes whenever a disturbance is applied to the magnetic head slider 31, the inertial force is applied to the gravity center G, so that all the forces for canceling the inertial force can be absorbed by the change in the hydrodynamic force fhm of the main slider rail 32. As a result, since the magnetic head slider 31 can be maintained in a stable contact status, it is possible to reduce the possibility that the recording and reproducing head 4 and the magnetic disk 101 are damaged, so that the life time of the apparatus can be lengthened.

In this embodiment, it should be noted that in order to set the gravity center G of the magnetic head slider 1 on the main slider rail 32, the second subsidiary slider rail 36 and the second connecting beam 35 serve as a balancing (counter) weight for the first subsidiary slider rail 34 and the first connecting beam 33. Therefore, it is possible to reduce the shape and the weight of the magnetic head slider 31 by determining the mutual relationship among these composing elements appropriately.

Figure 32:
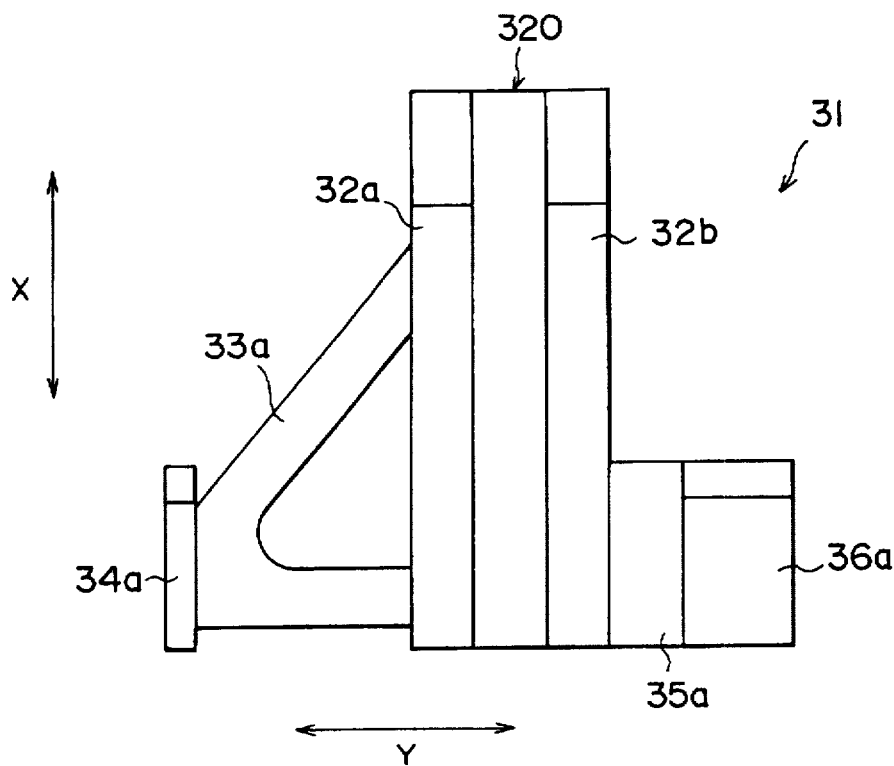
FIG. 32 is a back view showing a sixth embodiment of the recording and reproducing head slider according to the present invention.
Figure 33:
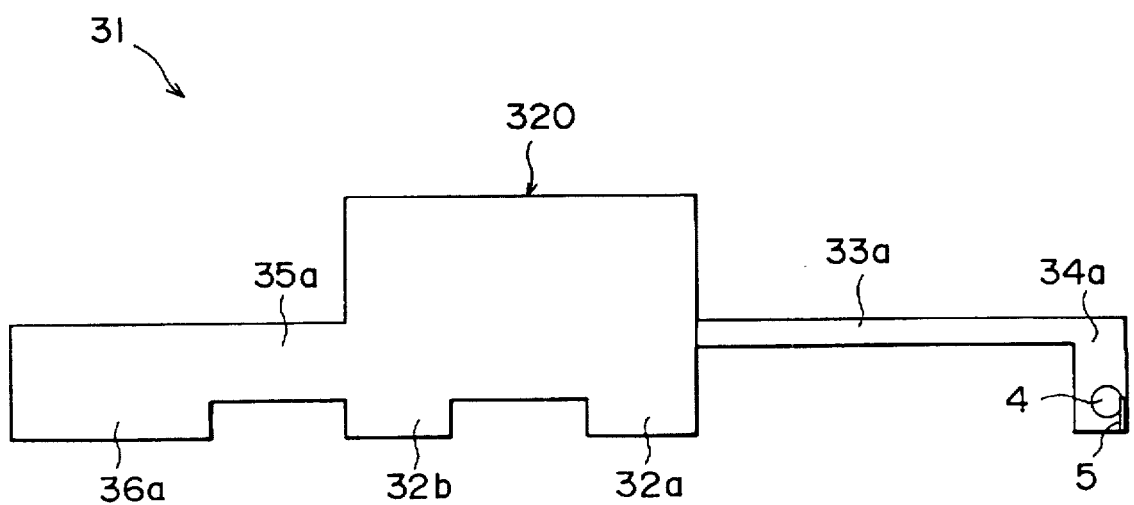
FIG. 33 is a side view showing the sixth embodiment of the recording and reproducing head slider according to the present invention.
Figure 34:
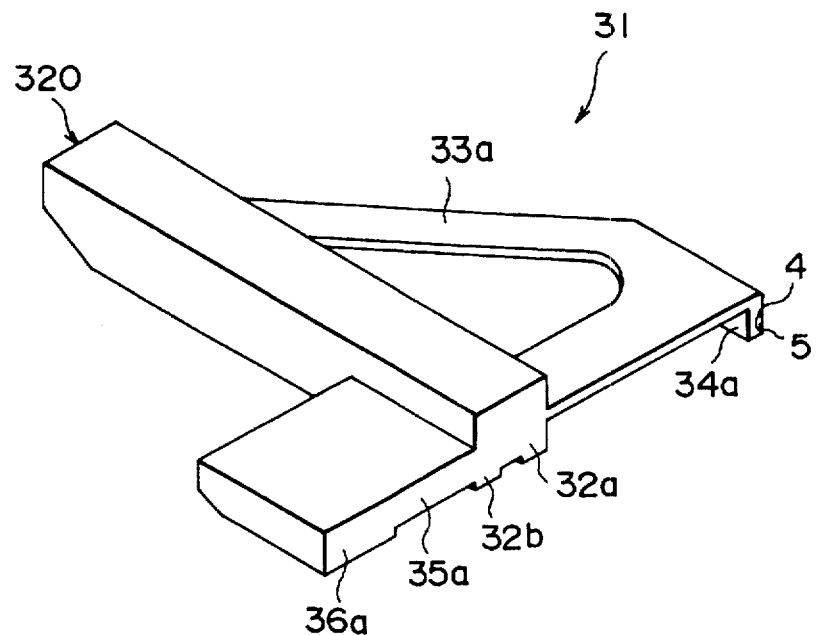
FIG. 34 is a perspective view showing the sixth embodiment of the recording and reproducing head slider according to the present invention.

A sixth embodiment of the magnetic head slider according to the present invention will be described hereinbelow with reference to FIGS. 32 to 34.

This sixth embodiment is different from the fifth embodiment in that a main slider rail 320 has two rails. In more detail, in this sixth embodiment, two slider rails 32a and 32b are arranged in parallel to each other between a first connecting beam 33a and a second connecting beam 35a.

Figure 35:
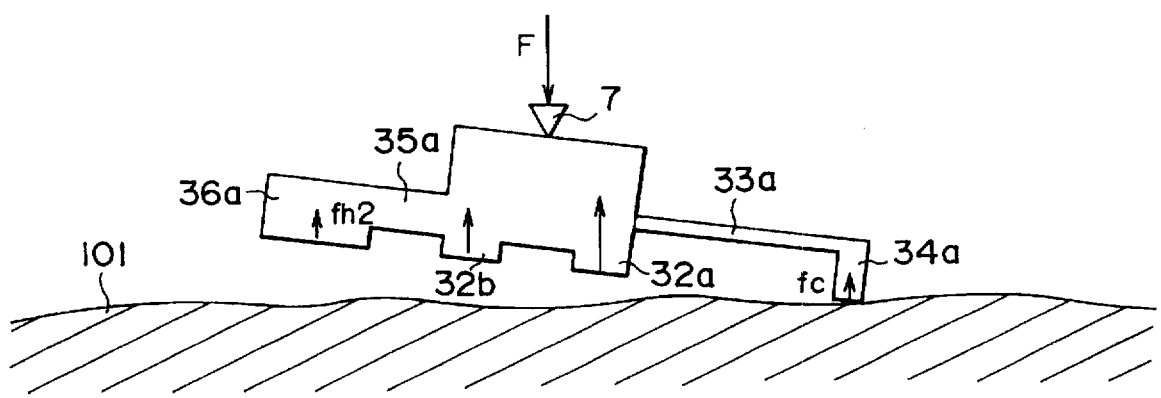
FIG. 35 is a cross-sectional view showing the sixth embodiment of the recording and reproducing head slider according to the present invention.

The combination of two parallel slider rails 32a and 32b contributes to effective prevention of the contact force fc from being fluctuated when the position of the pivot 7 is shifted in the radial direction of the magnetic disk 101, in addition to the effects of the above-mentioned embodiments. This is because, as shown in FIG. 35, the virtual rotational center (as shown by the reference numeral 38 in FIG. 23 used for the fifth embodiment) determined by the two slider rails 32a and 32b and the push force F can be decentralized (distributed to two positions) relative to the pivot position 7, so that the virtual rotational center position does not fluctuate sharply as with the case of the fifth embodiment shown in FIG. 23.

Figure 36:
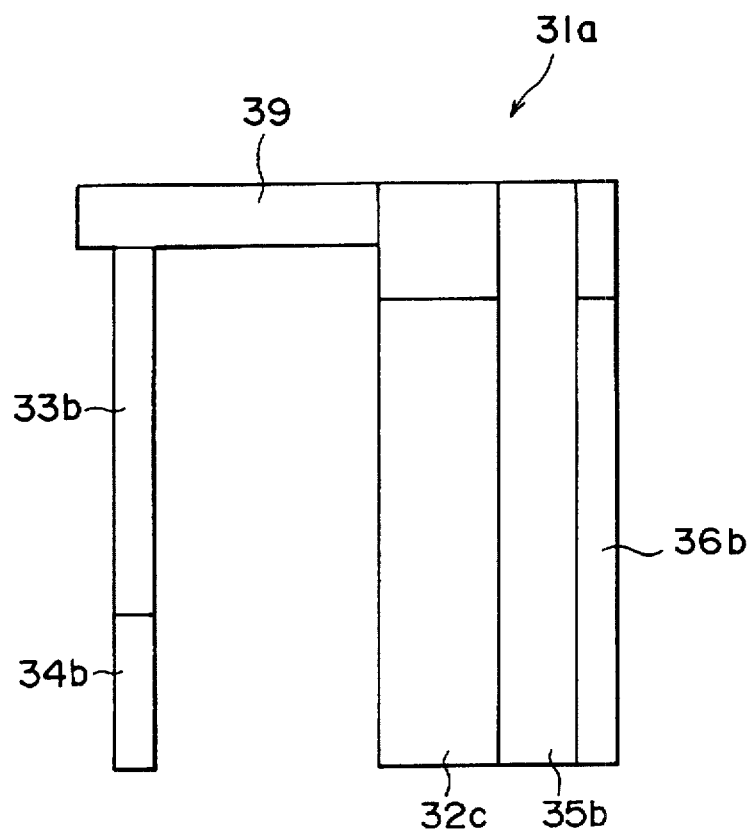
FIG. 36 is a back view showing a seventh embodiment of the recording and reproducing head slider according to the present invention.
Figure 37:
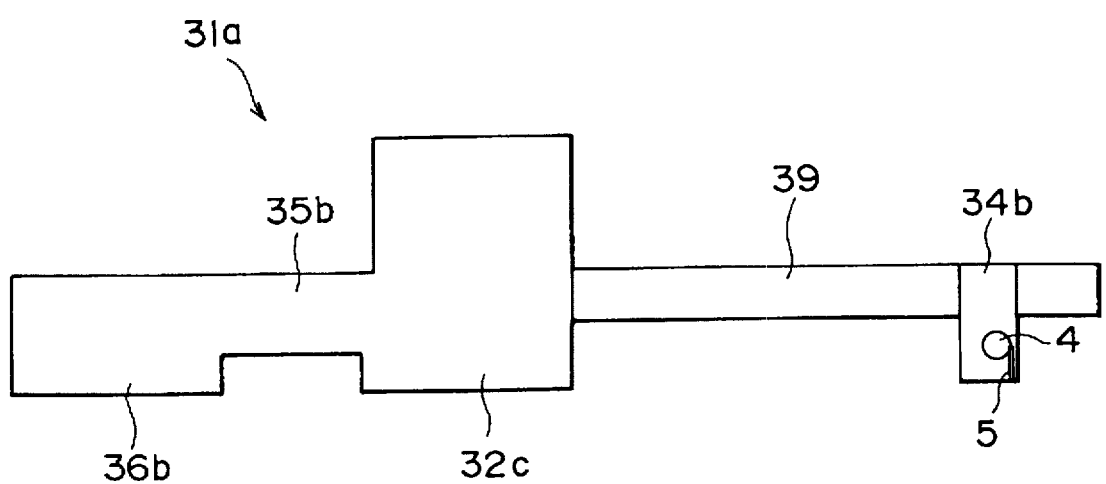
FIG. 37 is a side view showing the seventh embodiment of the recording and reproducing head slider according to the present invention.

A seventh embodiment of the magnetic head slider according to the present invention will be described hereinbelow with reference to FIGS. 36 to 38.

This seventh embodiment is different from the fifth embodiment in the shapes of a first connecting beam 33b and a second connecting beam 35b.

In this seventh embodiment, a lever 39 extends from an end of the main slider rail 32c in the lateral direction (the same as the radial direction of a magnetic disk (not shown). The first connecting beam 33b is fixed to near an end of this lever 39 and extends toward the air flow outgoing end. Further, the first subsidiary slider rail 34b is attached to a rear end of the first connecting beam 33b. The rigidity of the lever 39 is determined higher than that of the first connecting beam 33b. Further, it is possible to mount the lever 39 on the main slider rail 32c at a position more upward from the position shown in FIG. 37 (i.e., a position farther away from the surface of the magnetic disk).

The second connecting beam 35b extends toward the air flow outgoing end by a length the same as that of the main slider rail 32c. Further, a second subsidiary slider rail 36b having a length the same as that of the main slider rail 32c is provided on the side surface of the second connecting beam 35b.

The sizes (areas) of the first subsidiary slider rail 34b and the second subsidiary slider rail 36b are determined to be the same as with the cases of the fifth and sixth embodiments.

In the seventh embodiment constructed as described above, when another object exists over a magnetic disk, since the possibility of collision of the lever 39 against the object is high (or else the object passes through the gap between the lever 39 and the magnetic disk), it is possible to prevent the magnetic head slider 31a from being directly brought into contact with the object. Further, even if the object collides against the lever 39 and thereby a frictional force is generated, it is possible to prevent the first connecting beam 33b from being vibrated.

Figure 40:
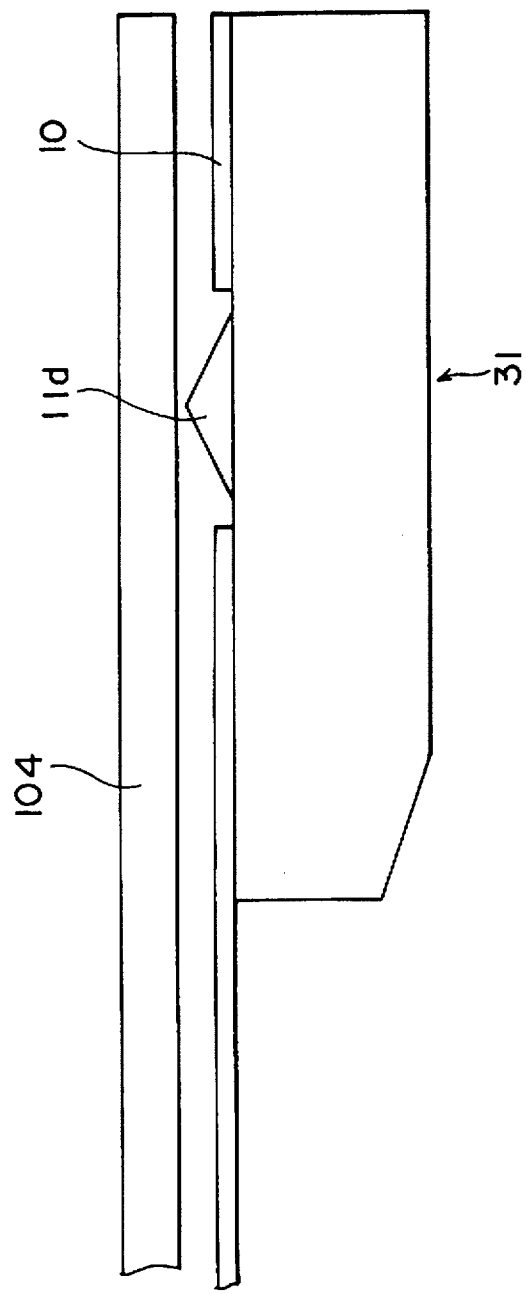
FIG. 40 is a cross-sectional view showing the projection formed on the main slider.

FIGS. 39 and 40 show a modification of a projection. In this modification being different from that shown in FIG. 20 of the fifth embodiment, a roughly pyramid shaped projection lid is formed on the main slider rail 32, and its apex is used as the position of a pivot. Further, as shown in FIG. 40, a predetermined push force F is applied from the end of a suspension 104 to the magnetic head slider 31b via the end portion (apex) of the projection lid.

The manufacturing method and the other structure of this projection lid are basically the same as with the case of the first embodiment shown in FIG. 11A, so that any detailed description thereof is omitted herein An eighth embodiment of the magnetic head slider according to the present invention will be described hereinbelow with reference to FIGS. 41 to 46. The construction of this embodiment is greatly different from that of the afore-mentioned respective embodiments.

In this eighth embodiment, a magnetic head slider 41 is provided with a U-shaped main slider rail 42, a connecting beam 43, and a subsidiary slider rail 44. The connecting beam 43 is disposed at the middle hollow portion of the U-shaped main slider rail 42 so as to extend toward the air flow outgoing end and having a relatively low rigidity. The subsidiary slider rail 44 is attached to an end of the connecting beam 43.

Figure 41:
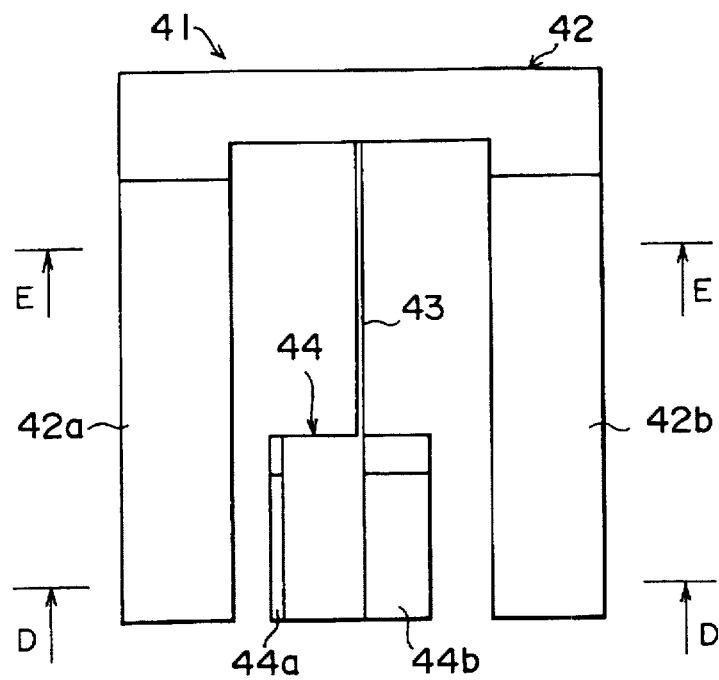
FIG. 41 is a back view showing an eighth embodiment of recording and reproducing head slider according to the present invention.

The main slider rail 42 is formed with a first main slider rail portion 42a and a second main slider rail portion 42b, and the areas of these main slider rail portions 42a and 42b are equal to each other, as shown in FIG. 41.

Figure 42:
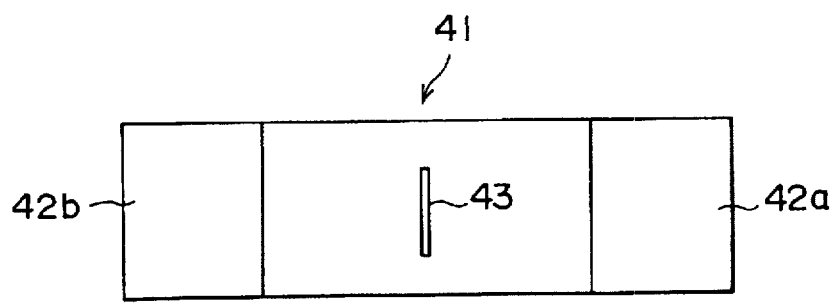
FIG. 42 is a cross-sectional eighth embodiment, taken along the line E—E shown in FIG. 41.

The vertical dimension (width) of the connecting beam 43 is determined sufficiently larger than the horizontal dimension (thickness) thereof, as shown in FIG. 42, in such a way that it is easily bendable by a torsional moment applied in the horizontal direction (i.e., the radial direction of a magnetic disk) but not easily bendable by a torsional moment applied in the vertical direction (i.e., the thickness direction of the magnetic disk).

Figure 43:
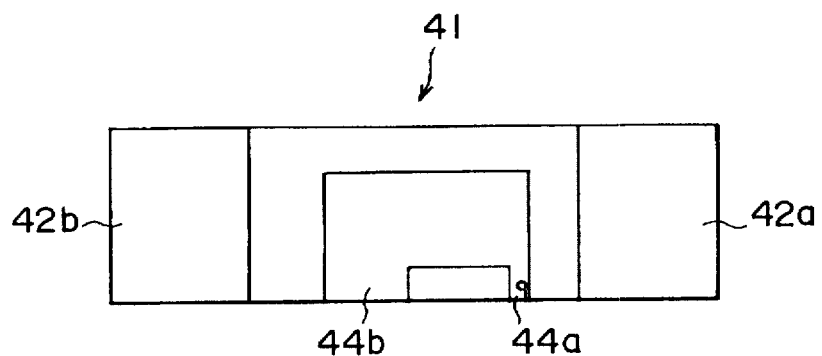
FIG. 43 is a cross-sectional eighth embodiment, taken along the line D—D shown in FIG. 41.
Figure 44:
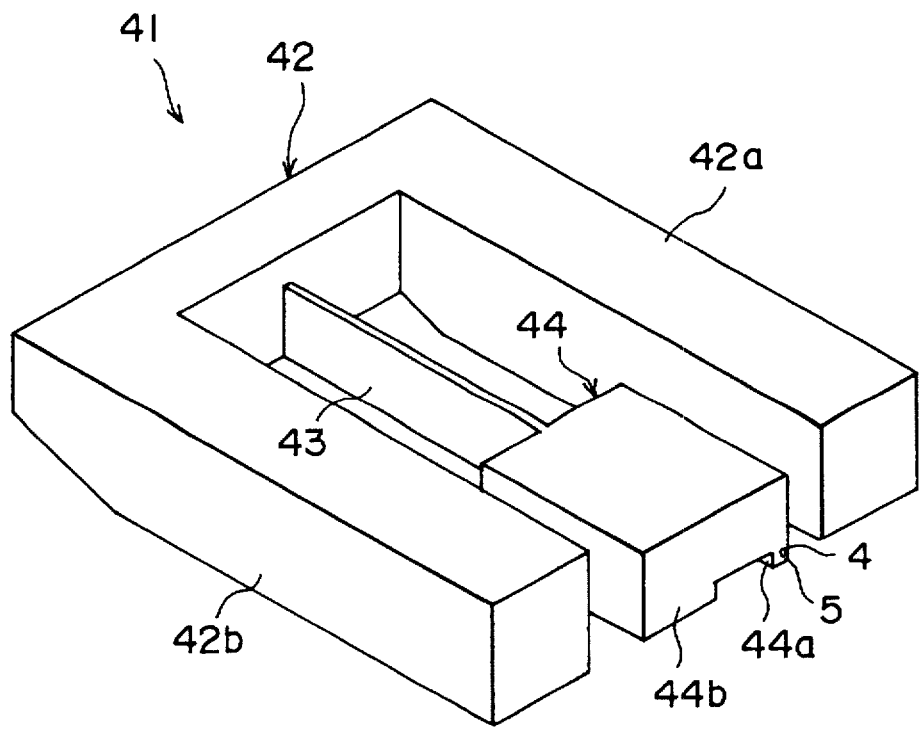
FIG. 44 is a perspective view showing the same eighth embodiment of the recording and reproducing head slider according to the present invention.

As shown in FIGS. 41 and 43, the subsidiary slider rail 44 has a first subsidiary slider rail portion 44a and a second subsidiary slider rail portion 44b. The width (i.e., area) of the first subsidiary slider rail portion 44a is determined less than a half of that of the second subsidiary slider rail portion 44b. Further, a recording and reproducing head 4 and a contact end 5 are arranged near the rear end of the first subsidiary slider rail portion 44a as shown in FIG. 44. Further, the subsidiary slider rail portion 44 is formed in such a way that its gravity center is located on an extension line of the connecting beam 43.

The main slider rail 42, the connecting beam 43, and the subsidiary slider rail 44 are all manufactured integral with each other through an etching process, for instance. Further, the recording and reproducing head 4 can be formed on the subsidiary slider rail 44 through deposition and etching process.

Figure 45:
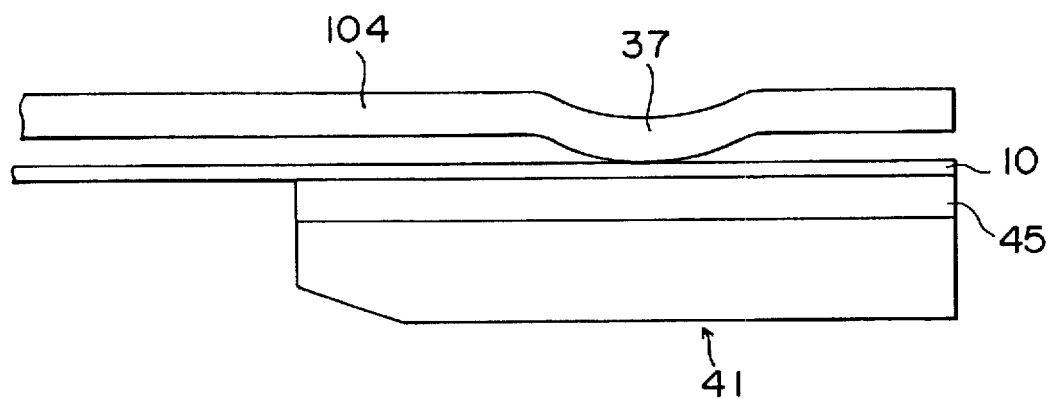
FIG. 45 is a cross-sectional view showing the projection formed on the suspension.

Further, as shown in FIG. 45, a reinforcing plate 45 is attached to the upper surface of the magnetic head slider 41 by means of diffusion junction. The reinforcing plate 45 is formed into a rectangular shape so as to cover the entire upper surface of the magnetic head slider 41, that is, to maintain both the first main slider rail portion 42a and the second main slider rail portion 42b for constituting the main slider rail 42 in a same plane (without being twisted).

Figure 46:
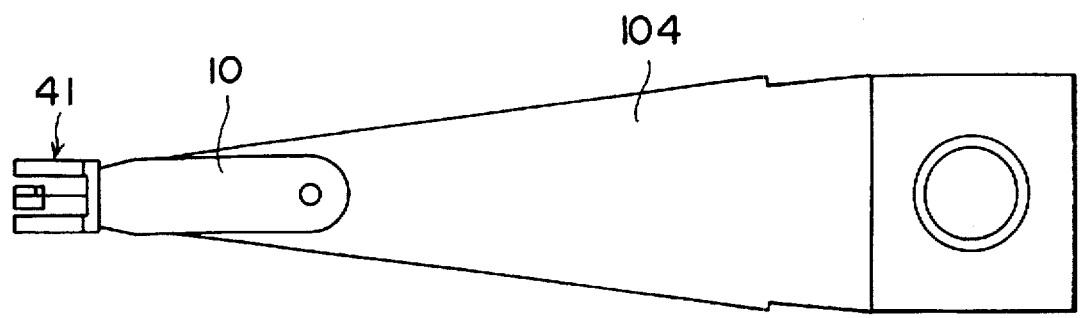
FIG. 46 is an illustration for assistance in explaining the method of mounting the recording and reproducing head slider on the suspension.

Further, as shown in FIG. 46, the reinforcing plate 45 is fixed to an end of a gimbals 10 by means of bonding agent, for instance. The gimbals 10 is a flat metallic plate spring fixed to an end of a suspension 104 roughly in parallel to the surface of a magnetic disk. Therefore, the gimbals 10 has a sufficient rigidity in the plane direction thereof, but is easily bendable in the inclination direction and bending direction thereof.

Further, as shown in FIG. 45, a projection 37 is formed near an end of the suspension 104 to apply a predetermined push force F to the middle portion of the reinforcing plate 45. In this eighth embodiment, since the push force F is applied near the middle portion of the reinforcing plate 45, it is possible to apply the push force F at the hollow pivot position of the magnetic head slider 41.

The operation of this eighth embodiment will be described hereinbelow.

The areas of the first and second main slider rail portions 42a and 42b are sufficiently larger than those of the first and second subsidiary slider rail portions 44a and 44b. Therefore, the hydrodynamic force generated by the subsidiary slider rail 44 is small to such an extent that it can be disregarded and therefore negligible, as compared with that generated by the main slider rail 42. As a result, it is possible to decide the floating distance dm of the magnetic head slider 41 on the basis of the balance of the hydrodynamic force fhm1 generated by the first main slider rail portion 42a, the hydrodynamic force fhm2 generated by the second main slider rail portion 42b, and the push force F applied by the suspension 104 via the projection 37.

Under these conditions, the floating distance at the rear end of the first subsidiary slider rail portion 44a is the same as that dm of the main slider rail 42.

Figure 47:
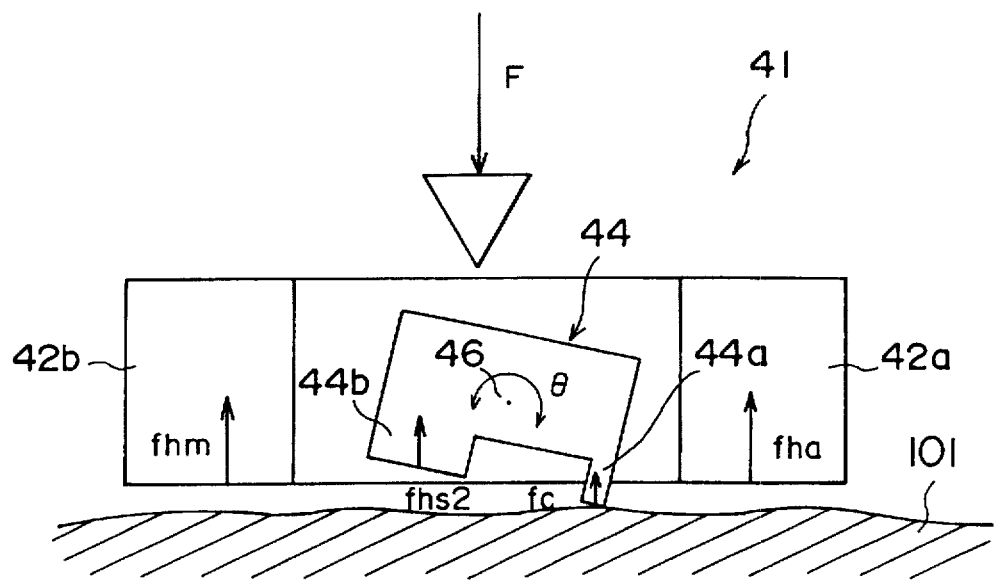
FIG. 47 is a cross-sectional view showing status of the subsidiary slider rail of the embodiment.

In practice, however, the subsidiary slider rail 44 is floated in such a state as shown in FIG. 47. In more detail, since the fluid bearing force fhs2 is generated by the second subsidiary slider rail portion 44b (whose area is larger than that of the first subsidiary slider rail portion 44a), the connecting beam 43 is twisted by this force fhs2, so that the subsidiary slider rail 44 is inclined as a whole. Therefore, as understood and shown by FIG. 47, the recording and reproducing head 4 formed at the air flow outgoing end of the first subsidiary slider rail portion 44a is further brought close or into contact with a magnetic disk.

Here, as already explained, the connecting beam 43 is formed in such a way that it is easily bendable in the horizontal direction but not easily bendable in the vertical direction. Therefore, the posture (the inclined status) of the subsidiary slider rail 44 can be determined by taking into account only the torsional deformation around a junction point 46 (the rotational center 46 shown in FIG. 47) between the subsidiary slider rail 44 and the connecting beam 43.

Figure 48:
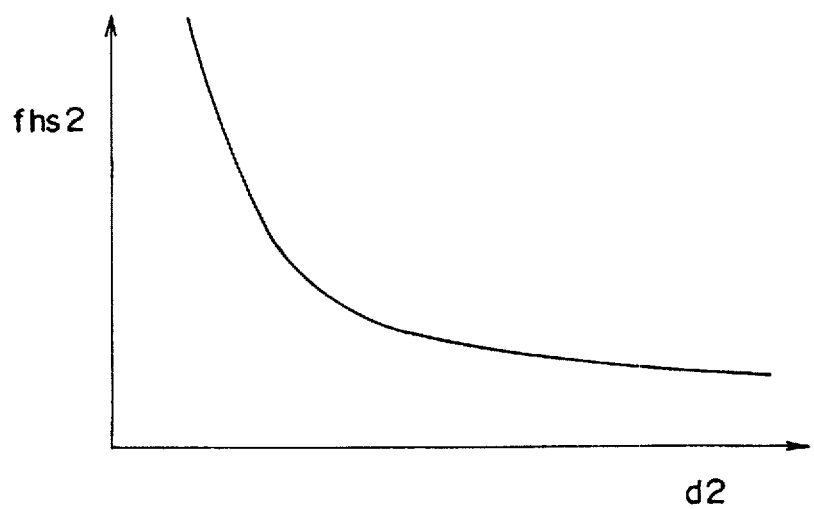
FIG. 48 is a graphical representation relationship between the floating distance hydrodynamic force fhs2.
Figure 49:
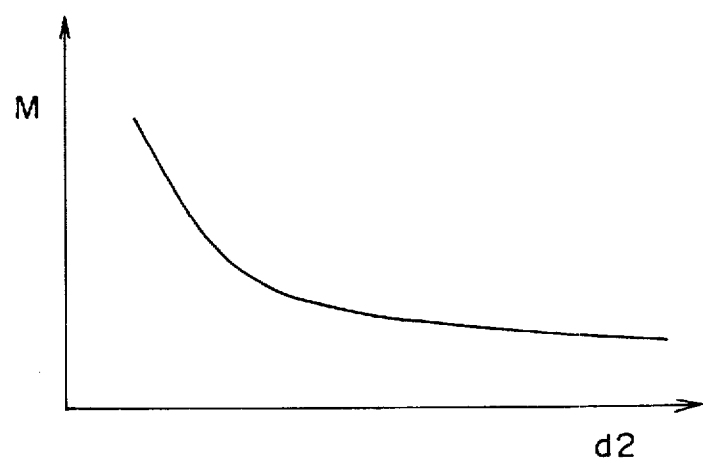
FIG. 49 is a graphical representation relationship between the floating distance rotational moment M2.

Further, when the floating distance of the first subsidiary slider rail portion 44a under non-contact condition with the magnetic disk 101 is denoted by d1; the contact force thereof under contact condition is denoted by fc, and the floating distance of the second subsidiary slider rail portion 44b is denoted by d2, since the hydrodynamic force fhs1 generated by the first subsidiary slider rail portion 44a is sufficiently smaller than that fhs2 generated by the second subsidiary slider rail portion 44b, the relationship between fhs2 and d2 can be represented as in FIG. 48. This figure indicates that the fluid bearing force fhs2 increases with decreasing floating distance d2. As a result, the moment M2 generated by the hydrodynamic force fhs2 of the second subsidiary slider rail portion 44b around the junction point 46 can be expressed as $$M2 = fhs2 \times l2 \qquad (8)$$

where l2 denotes a distance between the junction point 46 and a point of application of the hydrodynamic force fhs2, which is roughly equal to a distance between the junction point 46 and a middle position on a slide surface of the second subsidiary slider rail portion 44b. As shown in FIG. 49, this relationship is similar to that shown in FIG. 48.

Further, the torsional moment Md of the connecting beam 43 is proportional to the rotational angle, as expressed by the following equation:

$$Md = G \times (d2 - dm) \qquad (9)$$

Figure 50:
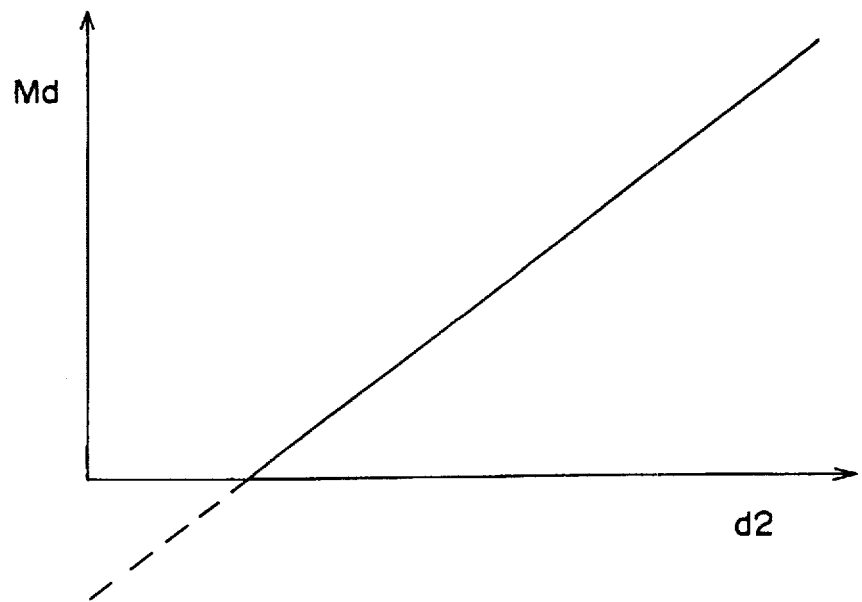
FIG. 50 is a graphical representation relationship between the floating distance torsional moment Md of the connecting beam.

This relationship can be represented as in FIG. 50, where G denotes a constant determined by the cross-sectional shape and the distance l2.

On the basis of the above-mentioned force balance relationship, first the state in which the first subsidiary slider rail portion 44a is in contact with the magnetic disk 101 will be described hereinbelow.

Here, the rotational moment Mfc generated by the contact force fc can be expressed as $$Mfc = fc \times l1 \qquad (10)$$

where l1 denotes a distance between the junction point 46 and the contact end 5.

In order that these moments M2, Md and Mfc may be balanced with each other, the contact force fc of the first subsidiary slider rail portion 44a can be obtained as follow:

$$fc = \{(fhs2 \times l2) - G(d2 - dm)\}/l1 \qquad (11)$$

The subsidiary slider rail 44 rotates with the junction point 46 as its center, and the height of the junction point 46 from the slide surface of the main slider rail 42 is dm (the floating distance of the magnetic head slider 41). Therefore, the relationship between the floating distance d1 of the first subsidiary slider rail portion 44a and the floating distance d2 of the first subsidiary slider rail portion 44b can be expressed as $$(dm - d1)/l1 = (d2 - dm)/l2 \qquad (12)$$

Here, when the first subsidiary slider rail portion 44a is in contact with the magnetic disk, since d1 is zero, the following equation can be established $$d2 = \{(l2/l1) + 1\} \times dm \qquad (13)$$

By substituting equation (13) for equation (11), fc can be decided unequivocally as follows:

$$fc = fhs2 \times l2 - G \times dm \times (l2/l1^2) \qquad (14)$$

where fhs2 can be obtained on the basis of the relationship shown in FIG. 48.

As described above, the contact force fc of the first subsidiary slider rail portion 44a can be decided unequivocally on the basis of the relationship among the proportional coefficient G (i.e., the shape of the connecting beam 43), the hydrodynamic force fhs2 generated by the second subsidiary slider rail portion 44b, the floating distance of the second subsidiary slider rail portion 44b (i.e., the shape of the slide surface of the second slider rail portion 44b), without being subjected to the other factors such as a mounting error of the main slider rail 42. The reason is as follows: since the floating distance of the second subsidiary slider rail portion 44b is larger than that dm of the main slider rail 42, it is possible reduce the harmful influence of fluctuations in the contact force due to dispersion of the floating distance dm of the main slider rail 42. This can be understood on the basis of the fact that the change rate of the first term fhs2 on the right side of equation (14) is small when the floating distance d2 is large (as well understood in FIG. 48) and further the fact that if l1>l2 in the equation (14), the change rate of the second term dm on the right side thereof can be compressed by (l2/l1²).

In addition, since the connecting beam 43 and the subsidiary slider rail 44 can be manufactured integral with each other at high precision by utilization of the silicon manufacturing process, it is possible to suppress the dispersion of the proportional coefficient G down to a very small value, without being subjected to the harmful influence of the assembly error, with the result that a highly precise contact force fc can be obtained.

Secondly, the fluctuation of the floating distance d1 will be described hereinbelow when the first subsidiary slider rail portion 44a is so designed that it is slightly floated over the magnetic disk 101 (without contact between the two).

Figure 51:
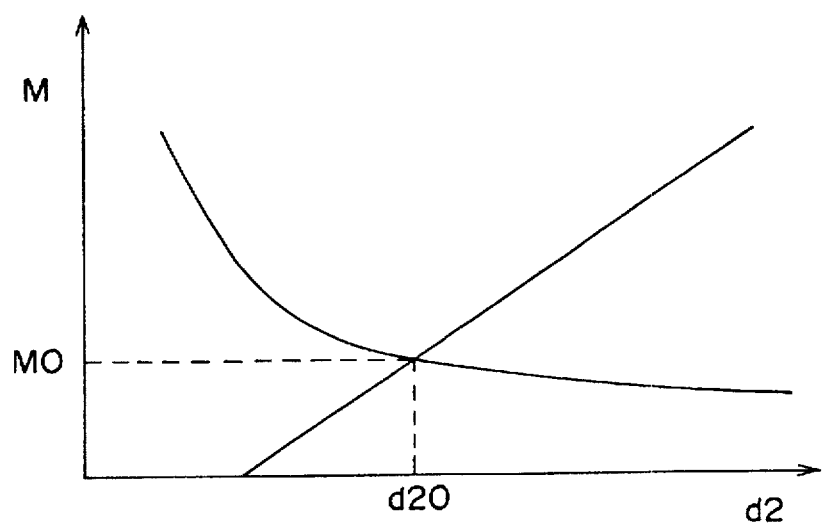
FIG. 51 is a graphical representation showing the relationship between the floating distance moment M.

In the already explained balancing condition of the moments, since the contact force fc of the first subsidiary slider rail portion 44a is zero, the moments are balanced by the torsional moment Md of the connecting beam 43, and the rotational moment M2 around the junction point 46 generated by the hydrodynamic force f2 of the second subsidiary slider rail portion 44b. In other words, as shown in FIG. 51 (which can be obtained by the relationship between FIGS. 48 and 49), an intersection point between both curves indicates a floating distance d20 on which the torsional moment Md and the rotational moment M2 become equal to each other, and the floating distance d1 of the first subsidiary slider rail portion 44a under these conditions can be expressed as the following equation by means of the equation (12):

$$d1=\{(I1+I2)/I2\}\times dm-(I1/I2)\times d20 \quad (15)$$

Here, the arrangement I2>I1 contributes to reduction of the influence of fluctuations in floating distance of the second subsidiary slider rail portion 44b.

The behavior caused when a shock is applied to the apparatus as disturbance will be described hereinbelow.

In this eighth embodiment, since the magnetic head slider is so constructed that the gravity center of the subsidiary slider rail 44 is located on an extension line of the connecting beam 43, in case a shock is applied to the apparatus, the connecting beam 43 is only deformed torsionally, without being deformed bendably. In this case, since the cross-sectional connecting beam 43 is such that the width in the vertical direction (in the direction to the surface of the magnetic disk 101) beam 43 is not easily bent or deformed direction. Therefore, the magnetic head formed into such a structure as to be almost harmful influence of the shock encountered in practice.

A ninth embodiment of the magnetic head slider according to the present invention will be described hereinbelow with reference to FIGS. 52 and 53.

This ninth embodiment is different from the eighth embodiment in the method of fixing the magnetic head slider to the suspension. In more detail, in the eighth embodiment, the magnetic head slider 41 is fixed to the suspension 104 via a layer structure (i.e., the gimbals 10 and the reinforcing plate 45) as shown in FIG. 45. In contrast with this, in the ninth embodiment, a magnetic head slider 41a is directly fixed to a suspension 104a.

As shown in FIG. 52, a wiring pattern is formed by aluminum deposition or an etching process so as to extend from the air flow incoming end of main slider rails 420a and 420b, through a connecting beam 43a, and a subsidiary slider rail portion 44a, to a recording and reproducing head 4.

Another wiring pattern (not shown) is also formed on its opposite side of the suspension 104a. Both the main slider rails 420a and 420b and the suspension 104a have contacts on each air flow incoming end of the main slider rails, so that the two wiring patterns can be connected to each other via these contacts by solder or gold. Further, the wiring pattern of the suspension 104a is introduced into a recording and reproducing apparatus unit (not shown) through the base portion of the suspension 104a.

Further, as shown in FIG. 53, the suspension 104a is formed with two slender slits 47 extending so as to surround a mounting surface 48 of the magnetic head slider 41a. Therefore, the magnetic head slider 41a fixed to the mounting surface 48 can be rotated in both the X-axis and Y-axis directions.

In the same way as with the case of the eighth embodiment, since a severe restriction is not required for the pivot position, the magnetic head slider 41a can be assembled relatively easily. In other words, the magnetic head slider 41a can be assembled only by setting the rotational center of the mounting surface 48 formed in the suspension 104a to a central portion of the magnetic head slider 41a, so that there exists such a practical advantage that the productivity of assembly process can be improved markedly.

A tenth embodiment of the magnetic head slider according to the present invention will be described hereinbelow with reference to FIGS. 54 to 57. The construction of this embodiment is characterized in the shapes of a main slider rail and a connecting beam.

Figure 54:
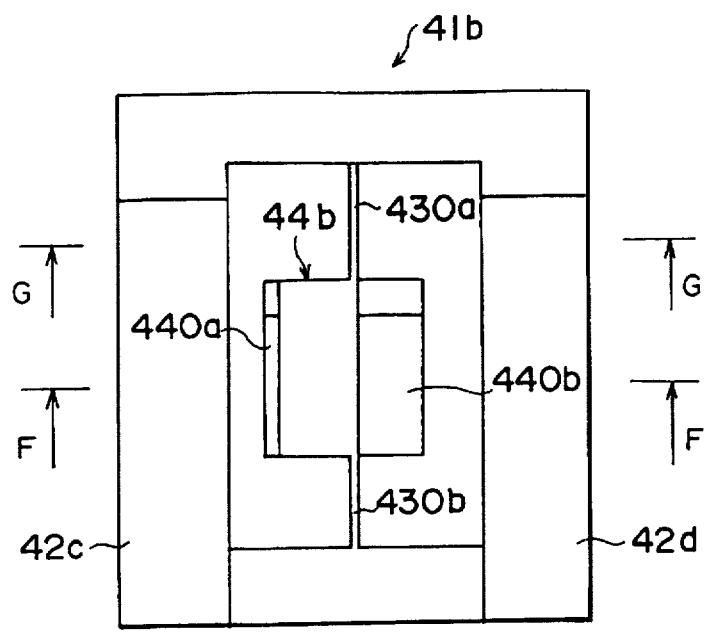
FIG. 54 is a back view showing a tenth embodiment of the recording and reproducing head slider according to the present invention.
Figure 55:
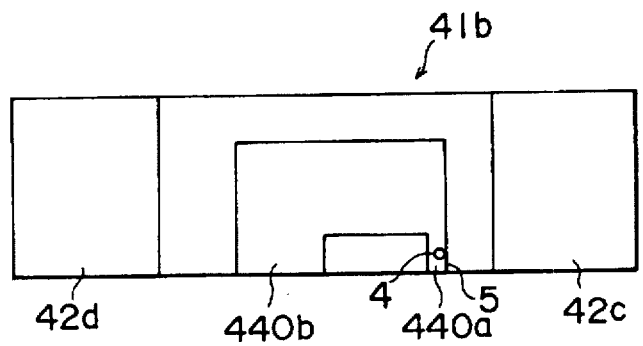
FIG. 55 is a cross-sectional tenth embodiment, taken along the line F—F shown in FIG. 54.
Figure 56:
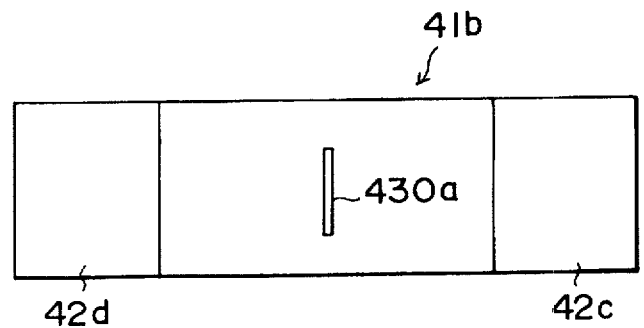
FIG. 56 is a cross-sectional tenth embodiment, taken along the line G—G shown in FIG. 54.

As shown in FIG. 54, the main slider rail has slider portions 42c and 42d, is formed into a square hollow shape, and has connecting beams 430a and 430b, and has a subsidiary slider rail 44b formed in the hollow portion of the main slider rail.

The connecting beam (430a, 430b) is of fixed beam (not of cantilever type as with the case of the eighth and ninth embodiments). The first connecting beam 430a is formed near the air flow incoming end and the second connecting beam 430b is formed near the air flow outgoing end of the main slider rail.

Further, the lengths of both the first and second connecting beams 430a and 430b are roughly equal to each other, and the subsidiary slider rail 44b is located at roughly a central portion of the hollow space of the main slider rail. The gravity center of the subsidiary slider rail portion 44b is located roughly on a straight line connecting between the two connecting beams 430a and 430b As described above, in this tenth embodiment, it is possible to markedly increase the rigidity of the subsidiary slider rail portion 44b around both the X- and Y-axis directions, so that the harmful influence of disturbance can be further suppressed effectively. This is because the structure of the such that the slider is such that the subsidiary slider rail 44 is supported on both the front and rear sides thereof, even if the rigidity around the Y-axis is set to the same value as that of the eighth and ninth embodiments.

Figure 59:
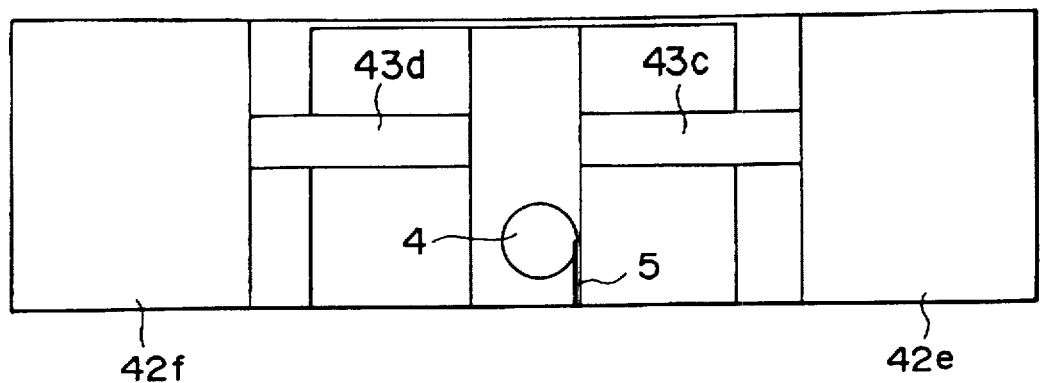
FIG. 59 is a side view showing the eleventh embodiment of the recording and reproducing head slider according to the present invention.
Figure 60:
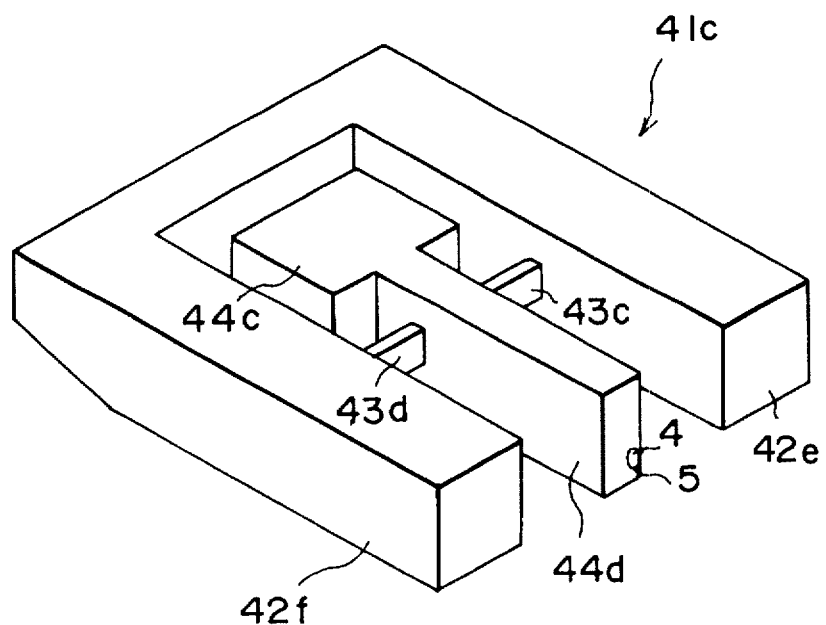
FIG. 60 is a perspective view showing the eleventh embodiment of the recording and reproducing head slider according to the present invention.

An eleventh embodiment of the magnetic head slider according to the present invention will be described hereinbelow with reference to FIGS. 58 to 60.

In this eleventh embodiment, the connecting beam is of fixed beam type, which has a right connecting beam 43c and a left connecting beam 43d both extending in a direction perpendicular to the air flow direction.

Further, a subsidiary slider rail 44 has a slider portion 44c formed on the air flow incoming side and a lever portion 44d formed on the air flow outgoing side. The width of the slider portion 44c is determined to be wider than that of the lever portion 44d, so as to receive a larger hydrodynamic force. The connecting beams 43c and 43d are connected to a part of the lever portion 44d. Further, a recording and reproducing head 4 and a contact end 5 are formed at the air flow outgoing end of the lever portion 44d. The gravity center of the subsidiary slider rail 44 is located on a straight line connecting between the two connecting beams 43c and 43d.

In this eleventh embodiment, the contact force fc of the subsidiary slider rail 44 can be decided in the same principle manner as with the case of the tenth embodiment. However, since the subsidiary slider rail 44 is formed into an elongated shape along the air flow direction, the distance between the rotational center (corresponding to the junction point 46 of FIG. 47) of the subsidiary slider rail 44 and the contact end 5 can be set to a longer value, so that there exists such an advantage that the fluctuations of the contact force fc can be further reduced.

Figure 61:
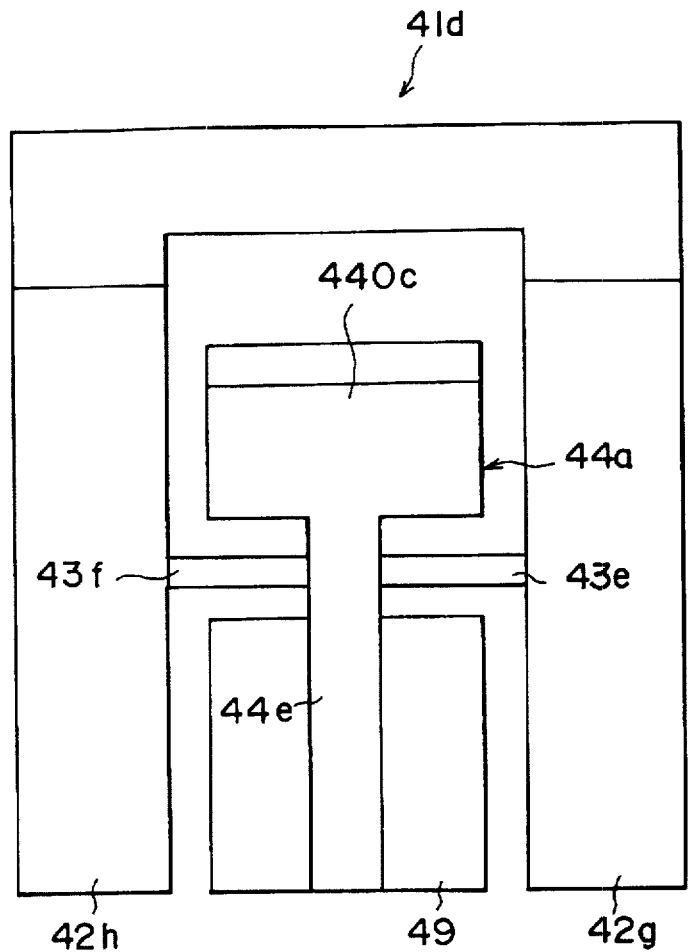
FIG. 61 is a back view showing a twelfth embodiment of the recording and reproducing head slider according to the present invention.
Figure 62:
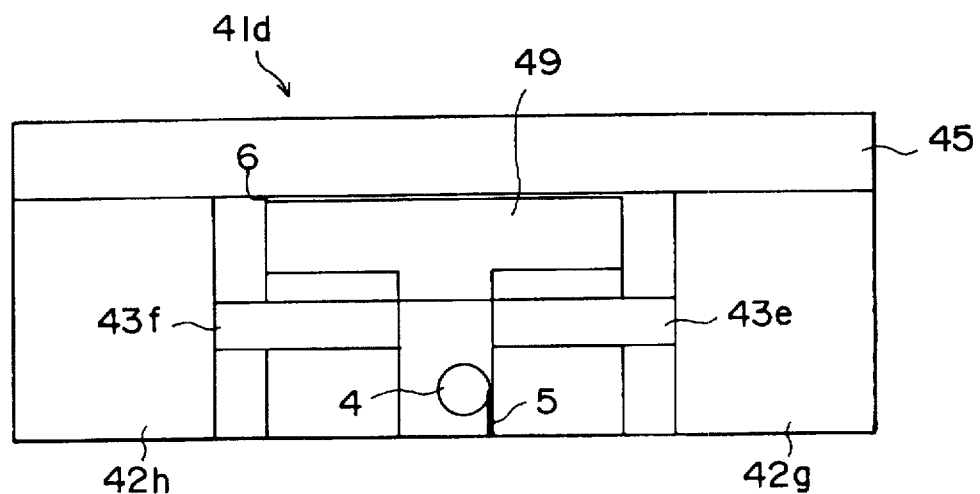
FIG. 62 is a side view showing the twelfth embodiment of the recording and reproducing head slider according to the present invention.

A twelfth embodiment of the magnetic head slider according to the present invention will be described hereinbelow with reference to FIGS. 61 to 63.

In this twelfth embodiment, the subsidiary slider rail portion 44a has a lever portion 44e and a rail portion 44c and is formed with a table 49 on the upper portion of the lever portion 44e. Further, a reinforcing plate 45 is mounted on the upper portion of a main slider rail 42 (42g, 42h) by means of diffusion junction, with a gap of about 2 μm between the reinforcing plate 45 and the table 49. Further, both the upper surfaces of the table 49 and the slider portion 440c are flush with each other on the same plane In this twelfth embodiment, constructed as described above, in addition to the same effect as with the case of the eleventh embodiment, it is possible to obtain a damping effect on the basis of a squeeze film effect produced between an air gap 6 (FIG. 62) between the reinforcing plate 45 and the table 49. Therefore, it is possible to prevent the subsidiary slider rail 44a from being vibrated abnormally, and thereby the recording and reproducing characteristics can be further stabilized.

Although the present invention has been described in its preferred embodiments, it is understood that the present invention can be modified in various ways, without departing from the spirit and the scope of the invention.

For instance, although the projections of various shapes have been explained, these projections can be combined with any of the various magnetic head sliders of the respective embodiments. Of course, it is possible to apply the projection formed on the suspension side (as shown in FIG. 25) to any of the magnetic head sliders of the respective embodiments.

Further, in the above-mentioned embodiments, as shown in FIG. 6, the recording and reproducing head and the contact end are both located on the central line of the first slider rail. Without being limited only thereto, it is also possible to construct the magnetic head slider in such a way that the recording and reproducing head and the contact end are located on the end surface (on the right side in FIG. 6) of the first slider rail. In the former case, the electrical insulation of the recording and reproducing head can be effectively maintained. In the later case, the recording and reproducing characteristics can be effectively improved.

Further, without being limited only to the magnetic disk apparatus located and driven by a rotary actuator, the same effects can be of course obtained when the present invention is applied to the other magnetic disk apparatus of linear actuator type.

In the respective embodiments, the magnetic head slider has been explained as an example of the recording and reproducing head sliders, and the magnetic disk apparatus has been explained as an example of the recording and reproducing apparatus. Without being limited only thereto, however, the present invention can be applied to other recording and reproducing apparatus such as optical data recording and reproducing apparatus.

As described above, in the recording and reproducing head slider according to the present invention, even when the recording and reproducing head slider is shifted in the radial direction on the data recording medium and thereby the position of the fluid bearing force applied in the tangential direction of the data recording fluctuates, since the position of the fluid bearing hardly fluctuates in the radial direction of the recording medium the contact force between the recording medium and the recording and reproducing hardly fluctuates. Further, even if an inertial applied to the recording and reproducing head slider changes due to vibration of the data recording medium or a shock applied to the apparatus, since almost the inertial force can be supported by the rigidity fluid bearing force, it is possible to reduce the fluctuations in the contact force applied to the recording and reproducing head as small a level as possible.

As a result, it is possible to realize the recording and reproducing head slider and the recording and reproducing apparatus using the same head slider such that the contact force between the data recording medium and the recording and reproducing head will not fluctuate largely and thereby the contact status between the two can be maintained stably.

What is claimed is:

1. A recording and reproducing head slider having a recording and reproducing head for recording and reproducing data in and from a data recording medium, an air flow being generated therebetween in a direction substantially parallel to the longitudinal axis of the recording and reproducing head slider, comprising:

a first slider rail having a surface facing the data recording medium, the surface having an air flow outgoing end, wherein the recording and reproducing head is attached to said first slider rail at the air flow outgoing end of the first slider rail;

a second slider rail having a surface facing the data recording medium, the surface of the second slider rail being larger than the surface of the first slider rail facing the medium, wherein the first and second slider rails are arranged so that the recording and reproducing head slider floats over the data recording medium by a hydrodynamic force generated by the air flow, wherein at least one of the length or the width of the first slider rail surface facing the medium is one half or less the length or the width of the second slider rail surface facing the recording medium, whereby the surface area of the first slider rail surface facing the medium is one half or less the surface area of the second slider rail surface facing the recording medium;

a push force application point portion, for application of a push force in a direction substantially perpendicular to the data recording medium, the push force application point portion being located at a position on the opposite side of the recording and reproducing head slider from the first and second slider rail surfaces and being closer to the second slider rail than the first slider rail in a direction substantially perpendicular to the longitudinal axis of the recording and reproducing head slider.

2. The recording and reproducing head slider of claim 1, further comprising a projection formed at the push force application point portion.

3. The recording and reproducing head slider of claim 1, further comprising a counter weight portion provided on a side of the recording and reproducing head slider opposite to the first slider rail with respect to the second slider rail, the second slider rail being located at approximately, and in parallel with, the longitudinal axis of the recording and reproducing head slider, so that a gravity center of the recording and reproducing head slider is located at a position approximately on the second slider rail.

4. The recording and reproducing head slider of claim 3, further comprising a third slider rail provided on the recording and reproducing head slider opposite and in parallel to the second slider rail with respect to the counter weight portion located therebetween.

5. A recording and reproducing head slider having a recording and reproducing head for recording and reproducing data in and from a data recording medium, an air flow being generated therebetween in a direction substantially parallel to the longitudinal axis of the recording and reproducing head slider, comprising:

a main slider rail provided with a surface facing the data recording medium;

a first subsidiary slider rail having a surface facing the data recording medium, the surface being smaller than the surface of the main slider rail facing the medium, and having an air flow outgoing end, the recording and reproducing head being attached to said first subsidiary slider rail at the air flow outgoing end of the first subsidiary slider rail;

a first connecting portion for connecting the main and first subsidiary slider rails;

a second subsidiary slider rail having a surface facing the data recording medium, the surface being larger than the surface of the first subsidiary slider rail and less than the surface of the main slider rail;

a second connecting portion having a rigidity higher than that of the rigidity of the first connecting portion, for connecting the main and second subsidiary slider rails, the main slider rail and the first and second subsidiary slider rails being arranged so that the recording and reproducing head slider floats over the data recording medium by a hydrodynamic force generated by the air flow; and a push force application point portion for application of a push force in a direction substantially perpendicular to the data recording medium, the push force application point portion being located on the main slider rail on the opposite side of the recording and reproducing head slider than the main slider rail surface.

6. The recording and reproducing head slider of claim 5, further comprising a projection formed at the push force application point portion.

7. The recording and reproducing head slider of claim 5, wherein the main slider rail is further comprised of two slider rail surface portions provided so as to have respective surfaces facing the data recording medium, the slider rail surface portions being substantially in parallel to each other.

8. A recording and reproducing head slider having a recording and reproducing head for recording and reproducing data in and from a data recording medium with an air flow being generated therebetween in a direction substantially parallel to the longitudinal axis of the recording and reproducing head slider, comprising:

a main slider rail having two main slider rail surface portions, each main slider rail surface portion having respective surface areas facing the data recording medium, the main slider rail surface portions being parallel to each other lengthwise and with respect to the longitudinal axis of the head slider; and a subsidiary slider rail having two subsidiary slider rail surface portions, each subsidiary slider rail surface portion having a respective surface area facing the data recording medium, the respective surface areas being different from each other and smaller than areas of the main slider rail surface portions facing the data recording medium, wherein the recording and reproducing head is attached to an air flow outgoing end of the one of the subsidiary slider rail surface portions having the smaller surface area facing the data recording medium;

a connecting portion for connecting the main slider rail and the subsidiary slider rail, the main and subsidiary slider rails being arranged so that the recording and reproducing head slider floats over the data recording medium by a hydrodynamic force generated by the air flow; and a push force application point portion for application of a push force in a direction substantially perpendicular to the data recording medium, the application point portion being located on the subsidiary slider rail with respect to the main slider rail and on the opposite side of the recording and reproducing head slider than the subsidiary slider rail surfaces.

9. The recording and reproducing head slider of claim 8, further comprising a plate fixed on an upper portion of the main slider rail so that the main slider rail surface portions are maintained substantially in a plane, the plane being substantially in parallel with the data recording medium, wherein the push force is applied in a direction toward the data recording medium through the plate.

10. A recording and reproducing apparatus for recording and reproducing data in and from a data recording medium, an air flow being generated therebetween in a direction substantially parallel to the longitudinal axis of the recording and reproducing head slider, comprising:

a first slider rail provided with a surface facing the data recording medium;

a second slider rail having a surface facing the data recording medium the second slider rail surface area being larger than the surface of the first slider rail facing the medium;

a recording and reproducing head attached to an air flow outgoing end of the first slider rail;

means for driving the first and second rails so that the recording and reproducing head floats over the data recording medium by a hydrodynamic force generated by the air flow; and a push force application point portion for application of a push force in a direction substantially perpendicular to the data recording medium, the application point portion being located at a position on the recording and reproducing head slider on the opposite side of the recording and reproducing head slider than the first and second rail surfaces and being closer to the second slider rail than the to first slider rail.

11. The recording and reproducing head slider of claim 10, further comprising a projection formed at the push force application point portion.

12. The recording and reproducing head slider of claim 10, further comprising a counter weight portion provided on a side of the recording and reproducing head slider opposite to the first slider rail with respect to the second slider rail, the second slider rail being located at approximately, and in parallel to, the longitudinal axis of the recording and reproducing head slider, so that the gravity center of the recording and reproducing head slider is located at a position approximately on the second slider rail.

13. The recording and reproducing head slider of claim 12, further comprising a third slider rail provided on the recording and reproducing head slider opposite and in parallel to the second slider rail with respect to the counter weight portion located therebetween.

14. A recording and reproducing head slider having a recording and reproducing head for recording and reproducing data in and from a data recording medium, an air flow being generated therebetween in a direction substantially parallel to the longitudinal axis of the recording and reproducing head slider, comprising:

a main slider rail provided with a surface facing the data recording medium;

a first subsidiary slider rail having a surface facing the data recording medium, the surface being smaller than the surface of the main slider rail facing the medium, and having an air flow outgoing end;

a first connecting portion for connecting the main and first subsidiary slider rails;

a second subsidiary slider rail having a surface facing the data recording medium, the surface being larger than the surface of the first subsidiary slider rail and less than the surface of the main slider rail;

a second connecting portion having a rigidity higher than that of the rigidity of the first connecting portion, for connecting the main and second subsidiary slider rails;

a recording and reproducing head attached to the first slider rail at the air flow outgoing end of the first subsidiary slider rail;

means for driving the main slider rail and the first and second subsidiary slider rails so that the recording and reproducing head floats over the data recording medium by a hydrodynamic force generated by the air flow; and a push force application point portion for application of a push force in a direction substantially perpendicular to the data recording medium, the push force application point portion being located on the main slider rail on the opposite side of the recording and reproducing head slider than the main slider rail surface.

15. The recording and reproducing head slider of claim 14, further comprising a projection formed at the push force application point portion.

16. The recording and reproducing head slider of claim 14, wherein the main slider rail is further comprised of two slider rail surface portions provided so as to have respective surfaces facing the data recording medium, the slider rail surface portions being in a plane and substantially in parallel to each other.

17. A recording and reproducing head slider having a recording and reproducing head for recording and reproducing data in and from a data recording medium with an air flow being generated therebetween in a direction substantially parallel to the longitudinal axis of the recording and reproducing head slider, comprising:

a main slider rail having two main slider rail surface portions, each main slider rail surface portion having a respective surface area facing the data recording medium, the main slider rail surface portions forming a plane and lengthwise being substantially in parallel to the longitudinal axis of the head slider and to each other; and a subsidiary slider rail having two subsidiary slider rail surface portions, each subsidiary slider rail surface portion having a respective surface area facing the data recording medium, the respective surface areas being different from each other, and each respective surface area being smaller than the surface areas of the main slider rail surface portions facing the data recording medium;

a connecting portion for connecting the main slider rail and the subsidiary slider rail;

a recording and reproducing head attached to an air flow outgoing end of the one of the subsidiary slider rail surface portions having a smaller surface area facing the data recording medium;

means for driving the main and subsidiary slider rails so that the recording and reproducing head floats over the data recording medium by a hydrodynamic force generated by the air flow; and a push force application point portion for application of a push force in a direction substantially perpendicular to the data recording medium, the push force application point portion being located on the subsidiary slider rail with respect to the main slider rail and on the opposite side of the recording and reproducing head slider than the subsidiary slider rail surface portions.

18. The recording and reproducing head slider of claim 17, further comprising a plate fixed on the main slider rail so that the main slider rail surface portions are situated in a plane substantially in parallel with respect to the data recording medium, wherein the push force is applied toward the data recording medium through the plate.

19. A recording and reproducing head slider having a recording and reproducing head for recording and reproducing data in and from a data recording medium, an air flow being generated therebetween, comprising:

a first slider rail having a surface portion facing the data recording medium, the first slider rail having an air flow outgoing end, wherein a recording and reproducing head is fixedly attached to said first slider rail at the air flow outgoing end;

a second slider rail having a surface portion facing the data recording medium, the surface area of the second slider rail surface portion being less than half the surface area of the first slider rail surface portion, wherein the first and second slider rails are substantially in parallel to the longitudinal axis of the head slider and arranged so that the recording and reproducing head slider floats over the data recording medium by a force generated by the air flow; and push force receiving means for receiving a push force from an external apparatus, said push force receiving means forming a raised portion on the uppermost surface of the head slider with respect to the data recording medium, said raised portion projecting in a direction substantially perpendicular to and away from the data recording medium, wherein said push force receiving means is located closer, in a direction substantially orthogonal to the longitudinal axis of the head slider, to said second slider rail than said first slider rail.

20. The recording and reproducing head slider of claim 19, wherein said first slider rail surface portion and said second slider rail surface portion each respectively further comprise plural subsidiary slider rail surface portions, wherein the respective plural subsidiary slider rail surface portions all face the data recording medium and are formed substantially in a plane.

* * * * *